United States Patent
Roy et al.

(10) Patent No.: US 10,331,301 B2
(45) Date of Patent: Jun. 25, 2019

(54) ELECTRONIC DEVICE AND METHOD OF DISPLAYING PLURALITY OF ITEMS

(71) Applicant: Samsung Electronics Co., Ltd., Suwon-si, Gyeonggi-do (KR)

(72) Inventors: Tanusri Roy, Bangalore (IN); Ravi Prasad RK, Bangalore (IN); Syam Sidhardhan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 15/254,507

(22) Filed: Sep. 1, 2016

(65) Prior Publication Data

US 2017/0102838 A1  Apr. 13, 2017

(30) Foreign Application Priority Data

Oct. 8, 2015  (IN) .......................... 1060/CHE/2015
Jul. 15, 2016  (KR) ........................ 10-2016-0090260

(51) Int. Cl.
| | |
|---|---|
| *G06F 3/0482* | (2013.01) |
| *G06F 3/0362* | (2013.01) |
| *G06F 3/0481* | (2013.01) |
| *G06F 3/0484* | (2013.01) |
| *G06F 3/0488* | (2013.01) |

(52) U.S. Cl.
CPC .......... *G06F 3/0482* (2013.01); *G06F 3/0362* (2013.01); *G06F 3/04817* (2013.01); *G06F 3/04845* (2013.01); *G06F 3/04847* (2013.01); *G06F 3/04883* (2013.01); *G06F 3/04886* (2013.01)

(58) Field of Classification Search
CPC .. G06F 3/0362; G06F 3/04817; G06F 3/0482; G06F 3/04845; G06F 3/04847; G06F 3/04883; G06F 3/04886
See application file for complete search history.

(56) References Cited

U.S. PATENT DOCUMENTS

| | | | |
|---|---|---|---|
| 7,992,102 B1 | 8/2011 | De Angelo | |
| 2007/0180392 A1 | 8/2007 | Russo | |
| 2009/0019397 A1 | 1/2009 | Buffet et al. | |
| 2009/0083665 A1* | 3/2009 | Anttila ................. | G06F 3/0482 715/834 |

(Continued)

FOREIGN PATENT DOCUMENTS

WO  2012-119735 A1  9/2012

*Primary Examiner* — Jennifer N To
*Assistant Examiner* — Reji Kartholy
(74) *Attorney, Agent, or Firm* — Jefferson IP Law, LLP

(57) ABSTRACT

An electronic device and a method of displaying one or more items are provided. The electronic device includes a display, and at least one processor configured to control for displaying at least one of a first menu and a second menu on the display, receiving a touch gesture connecting a first point and a second point, wherein the first point is a location corresponding to a first parameter that is one of a plurality of parameters included in the first menu and the second point is a location corresponding to a second parameter that is one of a plurality of parameters included in the second menu related to the first menu, and controlling a first input of selecting the first parameter and a second input of selecting the second parameter to be performed based on the touch gesture.

19 Claims, 59 Drawing Sheets

(56) References Cited

U.S. PATENT DOCUMENTS

| | | |
|---|---|---|
| 2011/0066981 A1 | 3/2011 | Chmielewski et al. |
| 2011/0307836 A1 | 12/2011 | Cho et al. |
| 2012/0026400 A1* | 2/2012 | Kang ............... H04N 21/42214 348/570 |
| 2012/0084281 A1* | 4/2012 | Colosi ............... H04L 29/12632 707/723 |
| 2013/0019205 A1* | 1/2013 | Gil ...................... G06F 3/04812 715/834 |
| 2013/0053105 A1* | 2/2013 | Lee ...................... H04M 1/673 455/565 |
| 2013/0104079 A1* | 4/2013 | Yasui ................... G06F 3/0482 715/834 |
| 2014/0071063 A1* | 3/2014 | Kuscher ................. G06F 3/041 345/173 |
| 2014/0359508 A1 | 12/2014 | Otero Diaz et al. |
| 2016/0147433 A1* | 5/2016 | Lin ..................... G06F 3/04883 715/834 |
| 2016/0327915 A1* | 11/2016 | Katzer .................. G04B 19/04 |

* cited by examiner

ELECTRONIC DEVICE AND METHOD OF DISPLAYING PLURALITY OF ITEMS

CROSS-REFERENCE TO RELATED APPLICATION(S)

This application claims the benefit under 35 U.S.C. § 119(a) of an Indian patent application filed on Oct. 8, 2015 in the Indian Patent Office and assigned Serial number 1060/CHE/2015, and of a Korean patent application filed on Jul. 15, 2016 in the Korean Intellectual Property Office and assigned Serial number 10-2016-0090260, the entire disclosure of each of which are hereby incorporated by reference.

TECHNICAL FIELD

The present disclosure relates to an electronic device. More particularly, the present disclosure relates to an electronic device and a method of displaying a plurality of items on a screen of the electronic device.

BACKGROUND

Generally, users not only receive content through a user interface (UI) while processing information by using an electronic device, but also provide responses through the UI. Recently, functions of electronic devices have become diversified and the amount of information processed by and stored in the electronic devices is gradually increasing. Accordingly, a UI that enables a user to efficiently interact with an electronic device while effectively managing an application is required.

In this regard, in order to provide various functions to a user by using a limited display screen, a general portable electronic device includes many push buttons or provides a UI including many menus. In order to use such various functions, the user using the general portable electronic device needs to access complicated menus included in the UI several times. Also, as the number of menus included in the UI of the general portable electronic device is increased and menu hierarchies become complicated, it is inconvenient for the user to memorize and use the menus.

For example, the number of applications on a screen of an electronic device is limited. Thus, when a user wants to execute a certain application or function, the user needs to swipe and move several pages on the screen of the electronic device to access a desired application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user interface (UI) that enables a user to intuitively use functions of an electronic device and to easily manage applications of the electronic device.

Another aspect of the present disclosure is to provide a UI that enables a user to access applications having high access frequencies via a simple operation, thereby saving the user the trouble of manual operations.

Additional aspects will be set forth in part in the description which follows and, in part, will be apparent from the description, or may be learned by practice of the presented embodiments.

In accordance with an aspect of the present disclosure, an electronic device for displaying a plurality of items is provided. The electronic device includes a display unit, and at least one processor configured to control for displaying at least one of a first menu and a second menu on the display, receiving a touch gesture connecting a first point and a second point, wherein the first point is a location corresponding to a first parameter that is one of a plurality of parameters included in the first menu and the second point is a location corresponding to a second parameter that is one of a plurality of parameters included in the second menu related to the first menu, and controlling a first input of selecting the first parameter and a second input of selecting the second parameter to be performed based on the touch gesture.

The first menu and the second menu may have circular shapes, and the pluralities of parameters included in the first menu and the second menu may be provided along the circular shapes.

The at least one processor may further be configured to control for moving locations of the plurality of parameters included in the first menu in a clockwise direction or a counterclockwise direction along the circular shape, based on the touch gesture.

The touch gesture may include a drag gesture connecting the first point included in the first menu and the second point in a curve.

The at least one processor may further be configured to control for displaying, on the display, at least one of a plurality of items based on the first input, the second input, and access frequencies of the plurality of items.

The at least one processor may further be configured to control for displaying the first menu to hide the second menu or may display the second menu to hide the first menu.

When the first menu is displayed to hide the second menu, the at least one processor may further be configured to control for receiving a tap gesture or a swipe gesture with respect to the first menu, and may display the second menu to hide the first menu based on the tap gesture or the swipe gesture.

When the first menu includes a plurality of alphabet letters and the second menu includes numbers, the controller may receive, based on the touch gesture, the first input for selecting one of the plurality of alphabet letters corresponding to the first point and the second input for selecting one of the numbers corresponding to the second point.

The at least one processor may further be configured to control for displaying an icon regarding at least one application having a name starting with a selected alphabet letter, based on the first input.

The at least one processor may further be configured to control for displaying an icon regarding a number of applications, which corresponds to a selected number, based on the second input.

The at least one processor may further be configured to control for displaying at least one group icon indicating a plurality of applications.

The at least one processor may further be configured to control for displaying a first menu including icons corresponding to a plurality of applications related to an application being executed, and a second menu including a plurality of items related to the application being executed.

The at least one processor, based on the first input of selecting one of the plurality of applications and the second input of selecting one of the plurality of items, may further be configured to control for linking an image corresponding to the selected item to the selected application.

In accordance with another aspect of the present disclosure, a method of displaying, by an electronic device, a plurality of items is provided. The method includes displaying at least one of a first menu and a second menu, receiving a touch gesture of connecting a first point and a second point, wherein the first point is a location corresponding to a first parameter that is one of a plurality of parameters included in the first menu and the second point is a location corresponding to a second parameter that is one of a plurality of parameters included in the second menu; and controlling a first input of selecting the first parameter and a second input of selecting the second parameter, to be performed based on the touch gesture.

In accordance with another aspect of the present disclosure, a method of managing a plurality of items based on an input detected by an electronic device is provided. The method includes displaying a first menu including a plurality of first parameters and a second menu including a plurality of second parameters, detecting a first input provided to the first menu displaying the plurality of first parameters, wherein the first input selects a first candidate parameter from among the plurality of first parameters, detecting a second input provided to the first menu or the second menu, wherein the second input selects a second candidate parameter from among the plurality of second parameters included in the second menu, and causing to display a set of candidate items based on the first input and the second input.

The second input provided to the first menu may cause the second candidate parameter to be selected from among the plurality of second parameters included in the second menu.

A plurality of candidate items selected from the set of candidate items may be arranged in at least one group.

The plurality of candidate items may be displayed on at least one of the first menu and the second menu.

The plurality of first parameters may each be an alphabet letter, a character, a symbol, an icon, or an image.

The plurality of first parameters may be dynamically displayed on the first menu. The plurality of first parameters may be a plurality of items of the electronic device.

The first menu or the second menu may be displayed in response to detecting a gesture on a display portion of the electronic device.

The first menu or the second menu may be rotated by rotating a bezel.

The plurality of second parameters may each be an alphabet letter, a character, a symbol, an icon, or an image.

The plurality of second parameters may be dynamically displayed on the second menu, and the plurality of second parameters may be a plurality of items of the electronic device.

The first menu and the second menu may be concentric to each other.

The first menu may be overlaid on the second menu.

The second menu may be transparently displayed when the first input is provided to the first menu.

The second menu may be displayed based on a gesture input provided to the first menu.

In accordance with another aspect of the present disclosure, a method of managing, by an electronic device, a plurality of items is provided. The method includes displaying a first menu including a plurality of first parameters, detecting a first input provided to the first menu with respect to a display portion of the electronic device, wherein said first input selects a first candidate parameter from among the plurality of first parameters included in the first menu, and causing to display a set of candidate items based on the first input.

In accordance with another aspect of the present disclosure, a non-transitory computer-readable recording medium has recorded thereon a computer program, which when executed by a computer, performs one of the methods above.

Other aspects, advantages, and salient features of the disclosure will become apparent to those skilled in the art from the following detailed description, which taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Figure 1A:
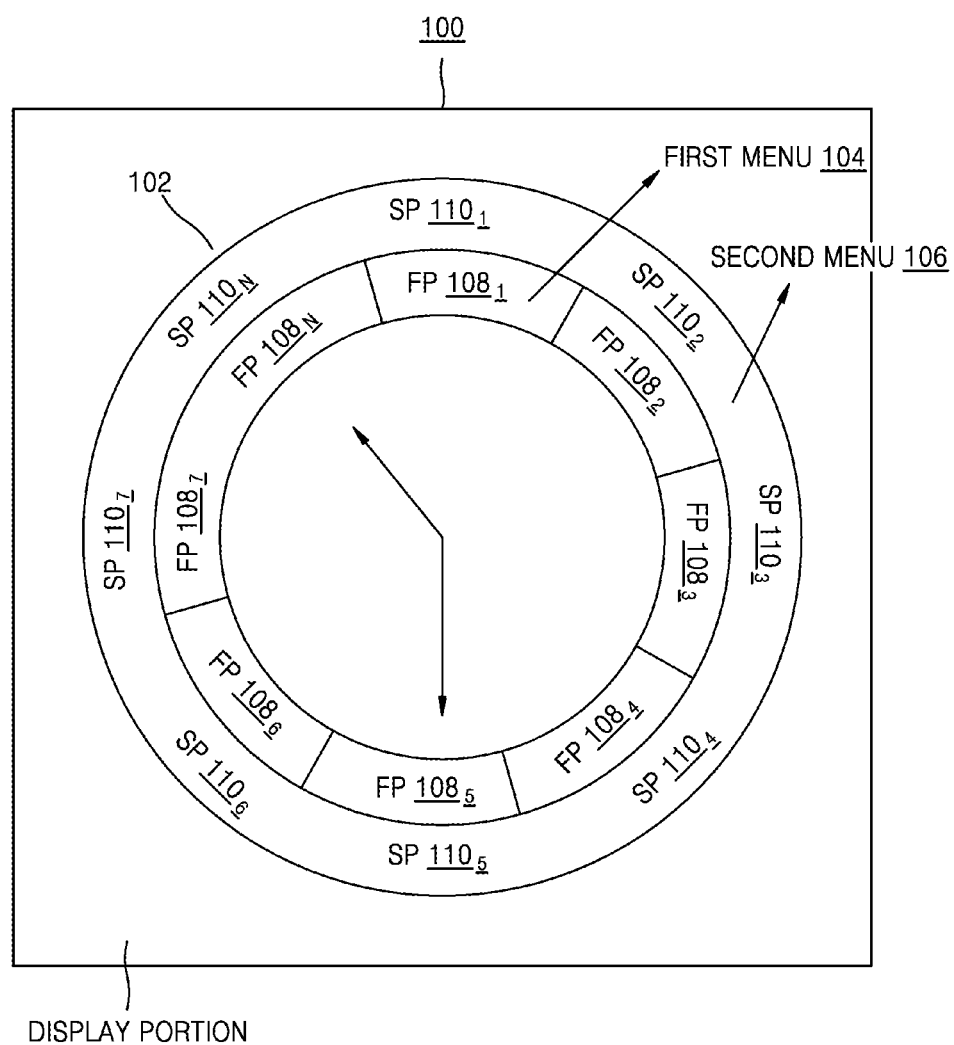
FIGS. 1A, 1B, and 1C illustrate examples of an electronic device according to various embodiments of the present disclosure.
Figure 1B:
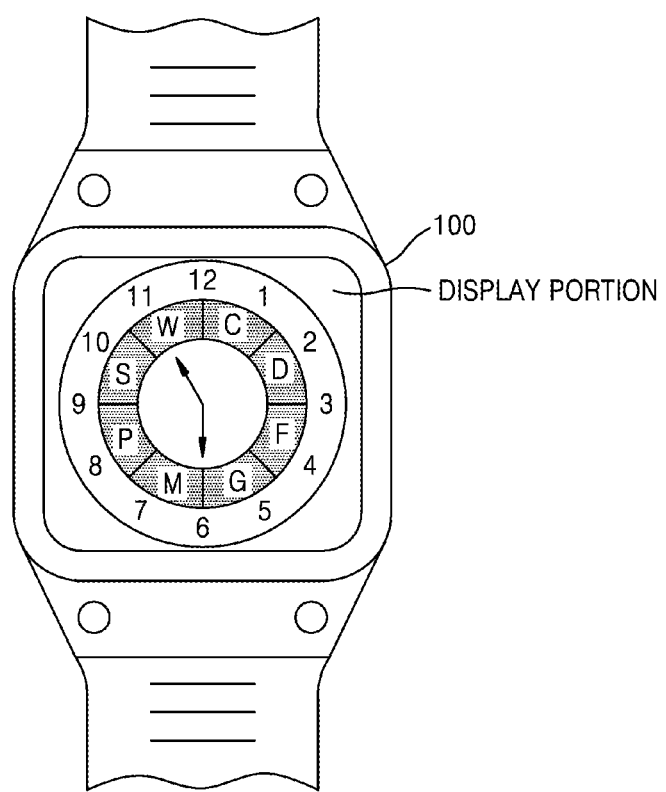
Figure 1C:
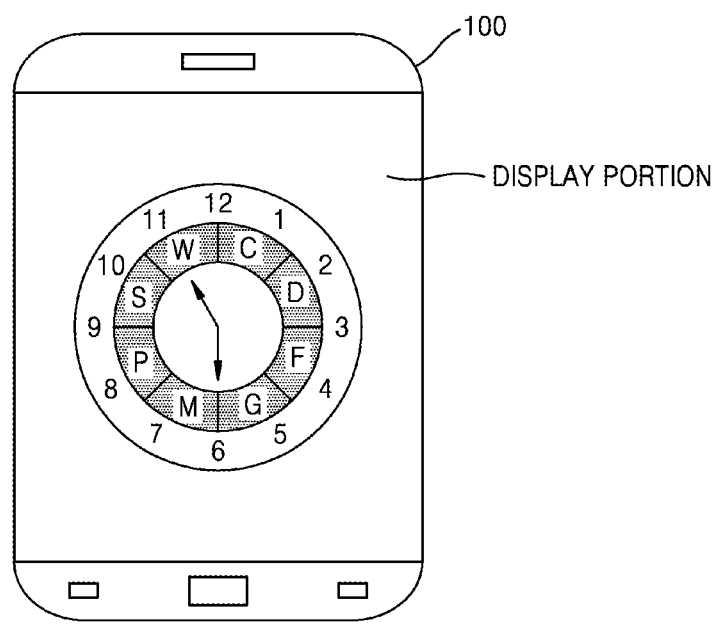

FIGS. 1A, 1B, and 1C illustrate examples of an electronic device 100 according to various embodiments of the present disclosure.

The electronic device 100 (represented/shown in FIG. 1A) may display a user interface (UI) 102 including at least one item. According to an embodiment, the electronic device 100 may be a laptop, a desktop computer, a mobile phone, a smart phone, a tablet personal computer (PC), a wearable device, or any other electronic device.

The UI 102 may be displayed on a display portion of the electronic device 100. Here, the display portion may be a screen of a display displaying information processed by the electronic device 100. When the display is configured as a touch screen as a display panel and a touch pad form a layer structure, the touch screen may receive an input from a user.

The UI 102 may include at least one menu. The at least one menu included in the UI 102 may have different functions. The at least one menu may include at least one parameter. The parameter may correspond to an item available in the electronic device 100. Here, the item may include an alphabet letter, a character, a symbol, an icon, an image, or a number.

Referring to FIG. 1A, the UI 102 may include a first menu 104 and a second menu 106. As shown in FIG. 1A, the first menu 104 and the second menu 106 may be concentric to each other. According to an embodiment, at least one of the first menu 104 and the second menu 106 may be rotatable. For example, the first menu 104 may be rotatable and the second menu 106 may not be rotatable, or vice versa.

The electronic device 100 may display the first menu 104 including a plurality of first parameters (FPs) $108_1$ through $108_N$, and hereinafter, the plurality of first parameters $108_1$ through $108_N$ are referred to as first parameters 108 (with N being any number larger than 7 in this example). The first parameters 108 may be dynamically displayed on the first menu 104. Here, displaying of parameters dynamically on the first menu 104 may mean that locations of the parameters displayed on the first menu 104 are changeable. For example, the locations of the parameters displayed on the first menu 104 may rotate in a clockwise direction or a counterclockwise direction. As another example, the types or number of parameters may be changed.

The plurality of first parameters 108 may respectively correspond to the plurality of items available in the electronic device 100. For example, the first parameters 108 may include application icons. Examples of an application may include a short messaging service (SMS) application, a call log application, a document viewer application, a browser application, a contacts application, a calendar application, a camera application, and social network service (SNS) sources. According to an embodiment, the SNS sources may include an image application, a chat application, a messenger application, and a camera application. According to another embodiment, the first parameters 108 may include numbers indicating a present time.

Also, the electronic device 100 may display the second menu 106 including a plurality of second parameters (SPs) $110_1$ through $110_N$, and hereinafter, the plurality of second parameters $110_1$ through $110_N$ are referred to as second parameters 110 (with N being a number larger than 7 in this example). The plurality of second parameters 110 may be dynamically displayed on the second menu 106. The second parameters 110 may respectively correspond to the plurality of items available in the electronic device 100. According to an embodiment, the second parameter 110 may correspond to a calendar application, a camera application, a contacts application, or another arbitrary application. Also, the second parameter 110 may include a character. The character included in the second parameter 110 may be an alphabet letter indicating the calendar application, the camera application, the contacts application, or the other arbitrary application. According to another embodiment, the second parameter 110 may include numbers (for example, for example, 1 through 12) indicating a present time.

According to an embodiment, the plurality of first parameters 108 included in the first menu 104 may be alphabet letters and the plurality of second parameters 110 included in the second menu 106 may be numbers (or vice versa). Such an embodiment will be described below with reference to FIG. 4A.

Also, according to an embodiment, the plurality of first parameters 108 included in the first menu 104 may be names of applications, and the plurality of second parameters 110 included in the second menu 106 may be photos. Such an embodiment will be described below with reference to FIG. 4B.

FIG. 1A shows the UI 102 simultaneously displaying the first menu 104 and the second menu 106, according to an embodiment. According to another embodiment, the UI 102 may include any one of the first and second menus 104 and 106. When the UI 102 includes only one of the first and second menus 104 and 106, the first menu 104 may be layered on the second menu 106 or the second menu 106 may be layered on the first menu 104. According to another embodiment, the UI 102 may include three or more menus.

Referring to FIG. 1A, the UI 102 may be UI that is circular in shape (including a circular and/or elliptical shapes). The circular UI enables many applications to be displayed on the display portion such that a user may easily access an application. When the electronic device 100 uses the circular UI, it is possible to search for an application in one page without having to input a swipe gesture for moving to another page of a screen.

According to an embodiment, the UI 102 may be displayed on the display portion of the electronic device 100 by using a short-cut button. For example, the UI 102 may be displayed on the display portion of the electronic device 100 when the display portion of the electronic device 100 is long-pressed. As another example, the UI 102 may be displayed when the display portion of the electronic device 100 is tapped or double-tapped.

According to another embodiment, when the user taps a part of the display portion, the electronic device 100 may display the first menu 104 including alphabet letters on the UI 102. In detail, a top portion of the display portion may be tapped to display the first menu 104. Also, when the top portion of the display portion is tapped while the first menu 104 is displayed, the electronic device 100 may stop displaying the first menu 104.

According to another embodiment, the electronic device 100 may display the first menu 104 including alphabet letters and the second menu 106 including numbers on the UI 102 based on a pinch-to-zoom gesture of the user, which is performed on a part of the display portion in a top-and-bottom direction. In detail, the electronic device 100 may determine the number of alphabet letters and numbers displayed on the UI 102 based on a pinch-to-zoom region of the display portion of the electronic device 100.

Referring to FIG. 1, the electronic device 100 may enable the user to access a plurality of applications by using the first and second menus 104 and 106 included in the UI 102. The electronic device 100 may display a plurality of applications for the user to easily access an application having a high priority based on one (a single) gesture input of the user.

An application having a high priority may be an application having a high access frequency by a user. Also, an application having a high frequency may be an application having a high frequency by a user at a certain stage. For example, the user may frequently access a gallery application and an SNS source application after executing a camera application.

When the user executed the camera application in the electronic device 100, the electronic device 100 may display a plurality of applications such that the gallery application and the SNS source application are easily accessed.

Meanwhile, the user may execute an application by, for example, touching an application icon and providing a swipe gesture towards a center of the display portion in the electronic device 100 displaying the plurality of applications.

The UI 102 is described to be circular with reference to FIG. 1A, but a shape of the UI 102 may be square, rectangular, triangular, polygonal or the like. Also, the UI 102 may include menus other than the first and second menus 104 and 106.

As shown in FIG. 1B, the electronic device 100 may include a wearable device. Examples of the wearable device include a watch, a bracelet, a ring, glasses, a hair band, or the like, which have communication functions and data processing functions. However, an example of the wearable device is not limited thereto. Also, as shown in FIG. 1C, the electronic device 100 may include a smart phone.

Meanwhile, the electronic device 100 is not limited to a wearable device or a smart phone, and may be any device capable of storing and displaying a plurality of applications. For example, the electronic device 100 may be a tablet PC, a mobile phone, a personal digital assistant (PDA), a media player, a portable multimedia player (PMP), an electronic book terminal, a digital broadcasting terminal, a PC, a laptop, a micro-server, a global positioning system (GPS) device, a navigation, a kiosk, an MP3 player, a smart television (TV), a digital camera, or another mobile or non-mobile computing device.

Unlike a general method for an electronic device, by using the electronic device 100 according to an embodiment, a plurality of applications may be managed via a simple operation without having to swipe a plurality of pages to find a desired application. For example, applications having high priorities may be executed via a single click. Also, executed applications may have easy accessibility to related applications. For example, the camera application may directly access the gallery and SNS source applications. Also, most favorite items may be accessed via a single tap. Accordingly, the effort of a manual operation of the user for accessing an application may be reduced.

Figure 2:
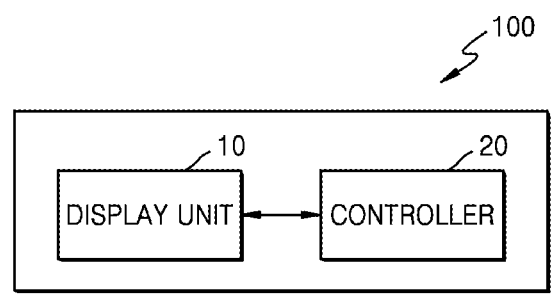
FIG. 2 is a block diagram of an electronic device for displaying a plurality of items, according to various embodiments of the present disclosure.

FIG. 2 is a block diagram of the electronic device 100 for displaying a plurality of items, according to various embodiments of the present disclosure.

Referring to FIG. 2, the electronic device 100 may include a display or display unit 10 and a controller 20. The controller 20 includes at least one processor. Also, the electronic device 100 may be the electronic device 100 shown in FIGS. 1A through 1C.

The display unit 10 may display a UI on the display portion of the electronic device 100.

The display unit 10 may be configured as a touch screen, as a display panel, and a touch pad form a layer structure. In this case, the touch screen may perform a function of an input unit (not shown).

The controller 20 may display at least one of a first menu and a second menu on the display unit 10. The first and second menus may be circular menus that are concentric to each other.

The controller 20 may receive a touch gesture connecting a first point and a second point to each other. The first point is a location corresponding to a first parameter that is one of a plurality of parameters included in the first menu and the second point is a location corresponding to a second parameter that is one of a plurality of parameters included in the second menu related to the first menu.

Here, the first point may correspond to a point where the touch gesture starts, and the second point may correspond to a point where the touch gesture ends.

The controller 20 may control an input of selecting at least one of the first parameter and the second parameter to be performed, based on the touch gesture.

Further, the controller 20 may control a first input of selecting the first parameter to be performed based on touching the first point during the touch gesture.

In addition, the controller 20 may control a second input of selecting the second parameter to be performed based on touching the second point during the touch gesture. For example, the second input may include an input of rotating the first menu via a drag gesture of connecting the first and second points in a curve. Also, the second input may include an input of selecting the second parameter at the location corresponding to the second point by touching the second point. The second point may be included on the first menu or the second menu.

According to an embodiment, the first and second menus may have a circular shape and the pluralities of parameters included in the first and second menus may be provided along the circular shapes. The controller 20 may move locations of the plurality of parameters provided on the first menu in a clockwise direction or a counterclockwise direction along the circular shape, based on the touch gesture.

Referring to FIG. 2, the controller 20 may receive a first input on the first menu and a second input on the first or second menu. The first and second inputs may be received from the user through the display unit 10. According to an embodiment, the second input may include an input for selecting at least one of the parameters included in the second menu by rotating the first menu in a clockwise direction or a counterclockwise direction. Also, the second input may be a touch input on the second menu, and may include an input for selecting at least one of the parameters included in the second menu.

The controller 20 may display, on the display unit 10, at least one of a plurality of items based on the first input, the second input, and access frequencies of the plurality of items. For example, the controller 20 may display the plurality of items such that a user easily accesses items having high priorities.

The items having high priorities may be items having high access frequencies by the user. Also, an application having a high priority may be items having high access frequencies by the user at a certain stage.

The controller 20 may display for example, four items in an order from highest access frequency.

The controller 20 may determine whether to display at least one of the first and second menus on the display unit 10, based on the touch gesture.

The controller 20 may display the first menu to hide the second menu or display the second menu to hide the first menu.

When the first menu is displayed to hide the second menu, the controller 20 may receive a tap gesture or a swipe gesture regarding the first menu, and display the second menu to hide the first menu based on the tap gesture or the swipe gesture.

According to an embodiment, the first menu may include a plurality of alphabet letters and the second menu may include a plurality of numbers. Here, the controller 20 may receive the first input for selecting one of the plurality of alphabet letters and the second input for selecting one of the plurality of numbers.

The controller 20 may display an icon regarding at least one application having a name starting with a selected alphabet letter, based on the first input. Also, the controller 20 may display an icon regarding the number of applications corresponding to a selected number, based on the second input.

Also, the controller 20 may display a selected number of application icons starting with a certain alphabet letter in an order from highest priority, based on the first and second inputs.

Meanwhile, when the number of applications selected based on the second input exceeds a pre-set number, the controller 20 may display at least one group icon indicating applications corresponding to some of the plurality of items.

According to another embodiment, the first and second menus may be a menu related to an application being executed.

The controller 20 may display the first menu including icons corresponding to a plurality of applications related to the application being executed. Also, the controller 20 may display the second menu including a plurality of items related to the application being executed. For example, when the application being executed is a camera application, the plurality of items may include an image.

Based on the first input of selecting one of the plurality of applications and the second input of selecting one of the plurality of items, the controller 20 may link an image corresponding to the selected item to the selected application.

The linking of the image to the selected application may be executing a function related to the image on the selected application. For example, when the selected application is an SNS application, the image may be uploaded to an SNS. Also, when the selected application is an image revising application, the image may be revised by using the selected application.

Also, the controller 20 may display a third menu including at least one of an icon, a new notification, and an unchecked notification regarding all applications being executed.

Figure 3A:
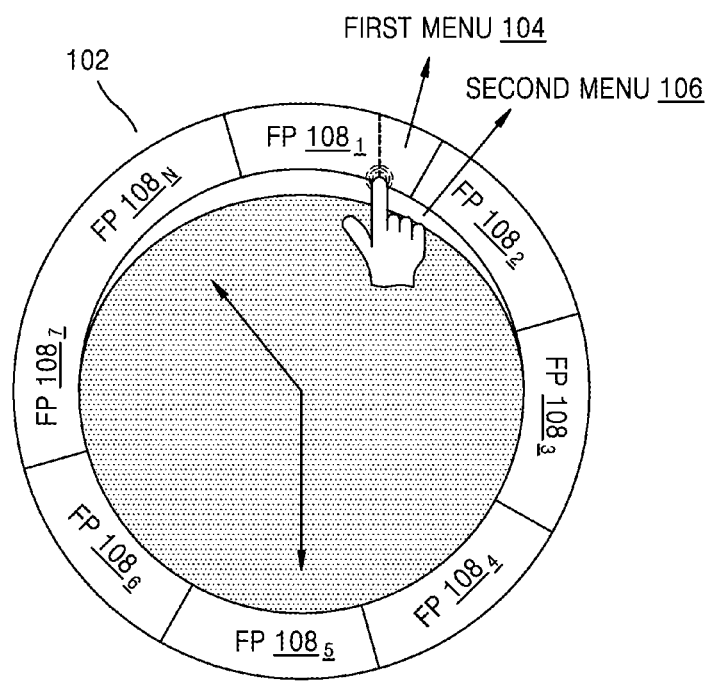
FIGS. 3A through 3C are diagrams for describing a first menu of an electronic device being layers on a second menu, according to various embodiments of the present disclosure.
Figure 3B:
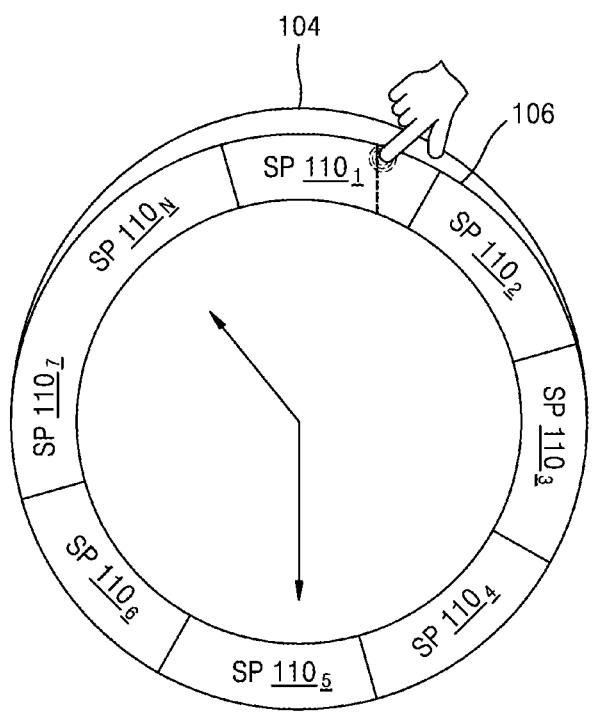
Figure 3C:
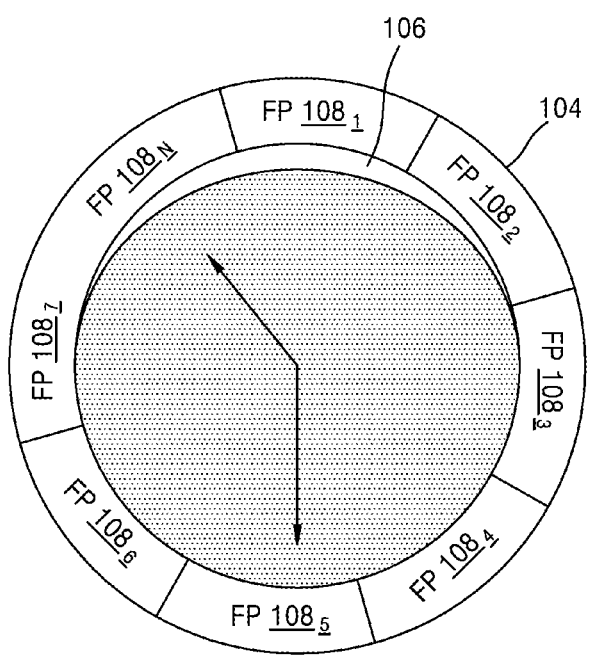

FIGS. 3A, 3B, and 3C are diagrams for describing the first menu 104 of the electronic device 100 (shown at least in FIG. 1), being layers on the second menu 106, according to various embodiments of the present disclosure.

Referring to FIG. 3A, the first menu 104 being layered on the second menu 106 in the electronic device 100 may mean that the first menu 104 is displayed such that the first menu 104 entirely hides the second menu 106 in the electronic device 100, and thus only the first menu 104 is accessible by the user. When the first menu 104 is layered on the second menu 106, the second menu 106 may not be displayed. Also, at this time, at least a part of the second menu 106 may be displayed such that the user recognizes the second menu 106.

When the first menu 104 is layered on the second menu 106 in the electronic device 100, the user may change the second menu 106 to be layered on the first menu 104 via a touch gesture (as shown in FIG. 3A). For example, the electronic device 100 may display the second menu 106 instead of the first menu 104 according to the touch gesture of the user. Also, the user may select any one of the first and second menus 104 and 106 to be displayed on the electronic device 100 according to the touch gesture.

When only one of the first and second menus 104 and 106 is displayed, the electronic device 100 may change a menu displayed on the display portion based on a swipe gesture on the first or second menu 104 or 106. Here, displaying of only one of several menus may include a case in which, while the one menu is entirely displayed, at least parts of the remaining menus are displayed.

For example, as shown in FIG. 3A, while the first menu 104 is layered on the second menu 106, the electronic device 100 may detect a swipe gesture heading outside the UI 102 with respect to the first menu 104. The swipe gesture heading outside the UI 102 may be a swipe gesture in a direction away from a center of the UI 102.

When the electronic device 100 detects the swipe gesture heading outside the UI 102 regarding the first menu 104 while the first menu 104 is layered on the second menu 106, the second menu 106 may be layered on the first menu 104. The second menu 106 being layered on the first menu 104 may mean that only the second menu 106 is displayed and the first menu 104 is not displayed.

In addition, as shown in FIG. 3B, while the second menu 106 is layered on the first menu 104, the electronic device 100 may detect a swipe gesture heading inside the UI 102 with respect to the second menu 106. The swipe gesture heading inside the UI 102 may be a swipe gesture approaching the center of the UI 102.

When the electronic device 100 detects the swipe gesture heading inside the UI 102 with respect to the second menu 106 while the second menu 106 is layered on the first menu 104, the first menu 104 may be layered on the second menu 106. For example, as shown in FIG. 3C, the first menu 104 may be layered on the second menu 106 such that only the first menu 104 is displayed and the second menu 106 is not displayed.

The UIs 102 having a circular shape shown in FIGS. 3A through 3C are only an example, and thus may have any shape (e.g., elliptical, polygonal, or the like).

FIGS. 4A, 4B, 4C, and 4D illustrate examples of the electronic device 100 displaying the first menu 104 and the second menu 106, according to various embodiments of the present disclosure.

Figure 4A:
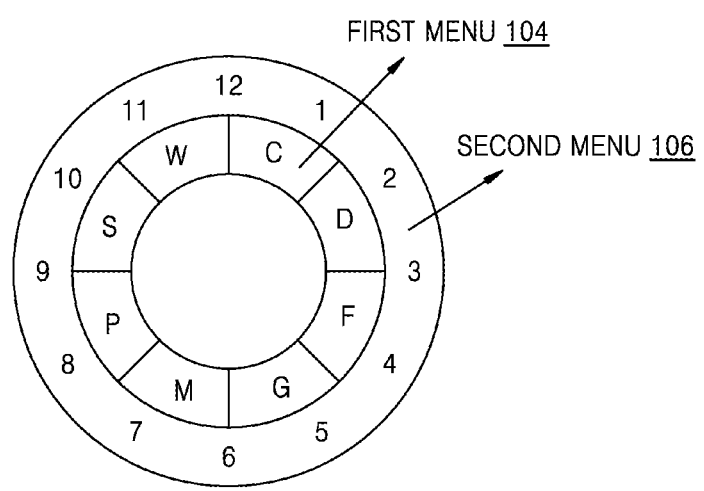
FIGS. 4A, 4B, 4C, and 4D illustrate examples of an electronic device displaying a first menu and a second menu, according to various embodiments of the present disclosure.

Referring to FIG. 4A, the first menu 104 may include first parameters. The first parameters may be, for example, alphabet letters, and may include "W", "C", "D", "F", "G", "M", "P", and "S". In detail, the alphabet letters included in the first menu 104 may correspond to starting alphabet letters of names of applications available in the electronic device 100, and the alphabet letters may also be arranged according to the preference of the user. Also, the electronic device 100 may include all alphabet letters from A to Z in the first menu 104.

According to an embodiment, the electronic device 100 may determine alphabet letters to be included in the first menu 104 according to applications installed in the electronic device 100. Also, the electronic device 100 may determine at least one of the alphabet letters included in the first menu 104 to disappear according to applications uninstalled in the electronic device 100.

Also, referring to FIG. 4A, the second menu 106 may include second parameters. The second parameters may be, for example, integers, and may include numbers from 1 to 12. In detail, numbers of the second menu 106 may indicate at least one of a time and a priority of an application. A priority of an application may be determined according to usage history of the user of the electronic device 100. Also, a priority of an application may be manually set by the user of the electronic device 100. Each alphabet letter may be a priority from 1 to 12. Also, 26 alphabet letters may each correspond to applications having priorities from 1 to 12. Accordingly, the electronic device 100 may match total 26×12=312 applications to each priority.

Figure 4B:
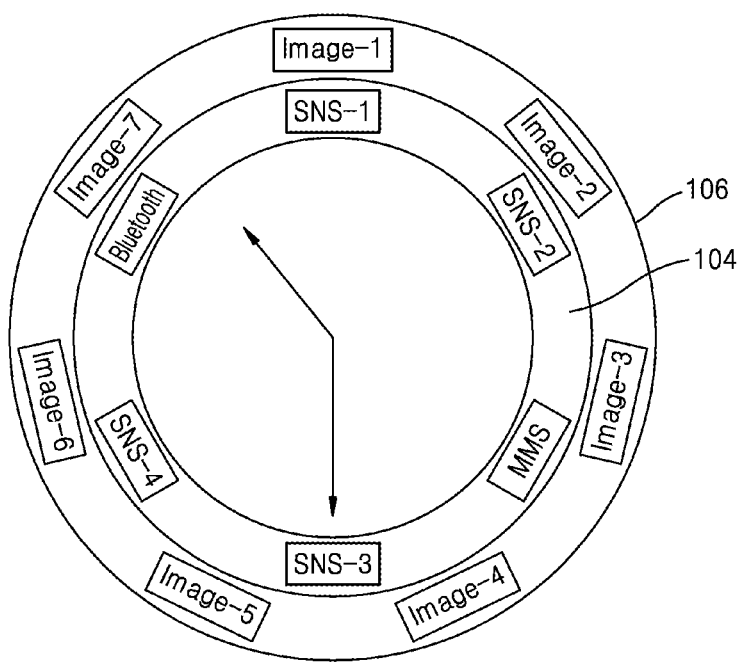

Referring to FIG. 4B, the first menu 104 may include an application icon. For example, application icons may include SNS-1, SNS-2, multimedia messaging service (MMS), SNS-3, SNS-4, and Bluetooth (BT), which are executable by the electronic device 100. In FIG. 4B, the second menu 106 may include images (Image-1, Image-2, Image-3, Image-4, Image-5, Image-6, and Image-7) stored in the electronic device 100.

Figure 4C:
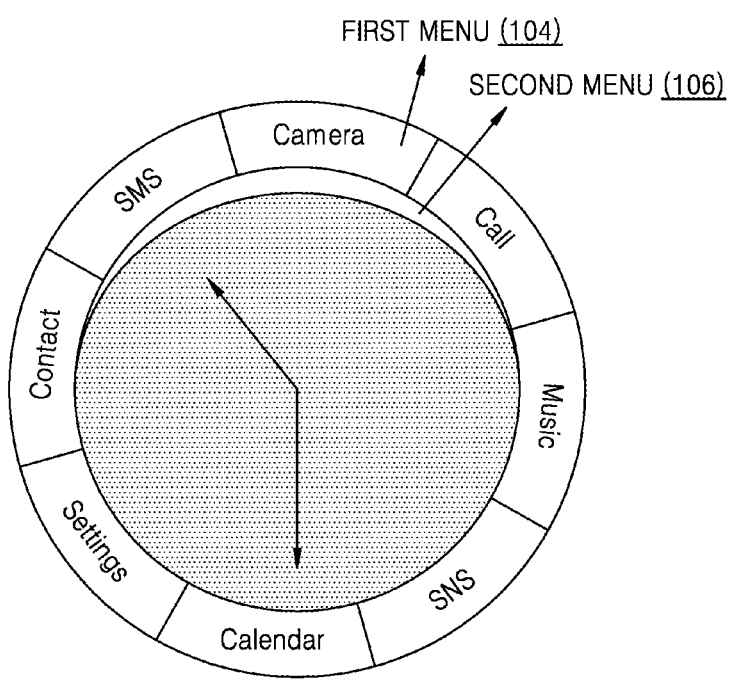

Referring to FIG. 4C, the first menu 104 may be layered on the second menu 106. Here, the first menu 104 may include names of applications. Referring to FIG. 4C, the names of applications may be, for example, camera, call, music, SNS, calendar, settings, contacts, and SMS. Also, the second menu 106 may include other names of applications installed in the electronic device 100.

When the first menu 104 is layered on the second menu 106, the electronic device 100 may display a part of the second menu 106 such that the user is aware that the first menu 104 is layered on the second menu 106.

Figure 4D:
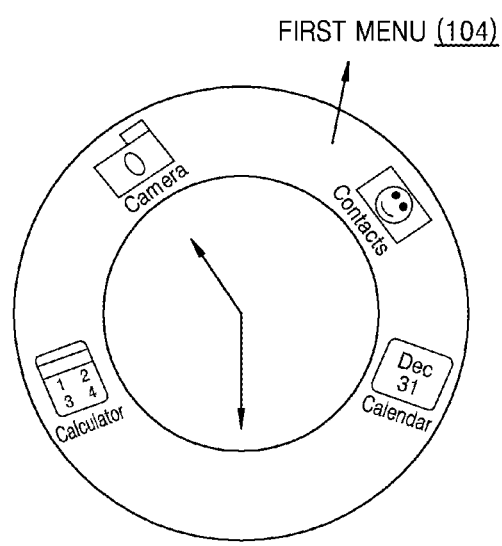

Referring to FIG. 4D, the first menu 104 may include application icons. Examples of the application icons may include a camera application icon, a contacts application icon, a calendar application icon, and a calculator application icon.

Figure 5:
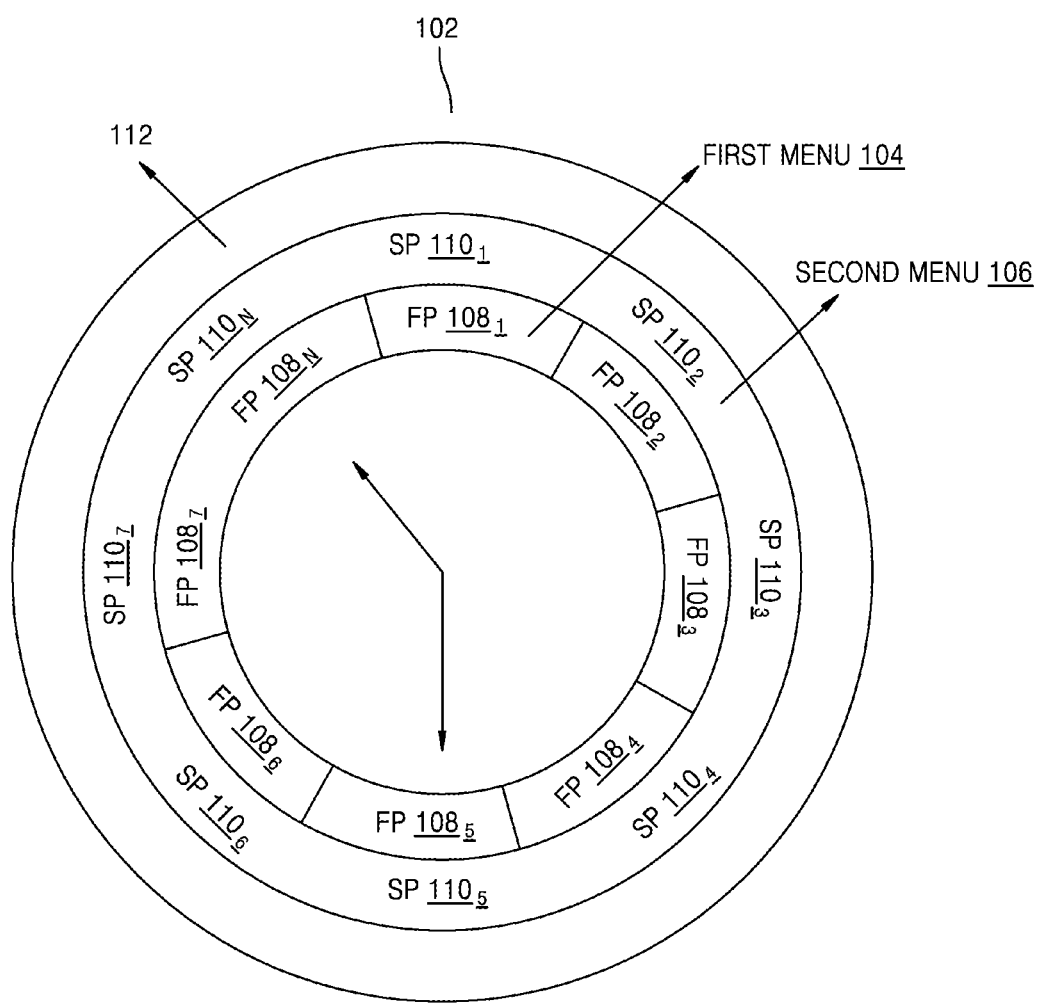
FIG. 5 illustrates a user interface (UI) of an electronic device including a bezel to control a first menu and a second menu, according to various embodiments of the present disclosure.

FIG. 5 illustrates the UI 102 of the electronic device 100 including a bezel ring 112 to control the first menu 104 and the second menu 106, according to various embodiments of the present disclosure.

Referring to FIG. 5, the bezel ring 112 may be used to rotate the first menu 104. According to another embodiment, the bezel ring 112 may be used to rotate the second menu 106. Further, the bezel ring 112 may be used to rotate at least one of the first and second menus 104 and 106.

According to an embodiment, the electronic device 100 may display the first and second menus 104 and 106 in different colors. The display portion of the electronic device 100 may display the same color as a color displayed on at least one of the first and second menus 104 and 106. The electronic device 100 may select a color based on a tap gesture of the user on the display portion. For example, the electronic device 100 may select the same color as a color displayed on the first menu 104 from the display portion based on the tap gesture of the user. When the same color as the color displayed on the first menu 104 is selected, the electronic device 100 may rotate the first menu 104 according to control of the bezel ring 112. Also, the electronic device 100 may select the same color as a color displayed on the second menu 106 based on the tap gesture of the user. When the same color as the color displayed on the second menu 106 is selected, the electronic device 100 may rotate the second menu 106 according to control of the bezel ring 112.

The UI 102 having a circular shape shown in FIG. 5 is only an example, and the UI 102 may have any shape including the first menu 104, the second menu 106, and the bezel ring 112.

Figure 6:
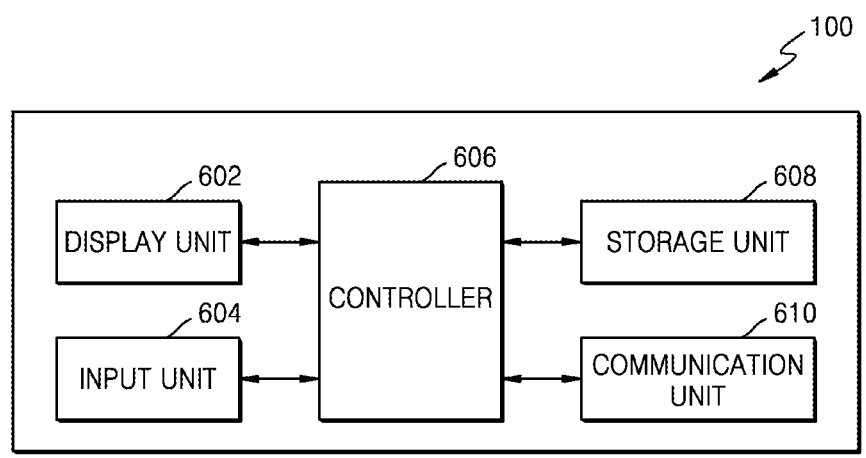
FIG. 6 is a block diagram of an electronic device for displaying a plurality of items, according to various embodiments of the present disclosure.

FIG. 6 is a block diagram of the electronic device 100 for displaying a plurality of items, according to various embodiments of the present disclosure.

Referring to FIG. 6, the electronic device 100 may include a display or display unit 602, an input device or input unit 604, at least one processor or controller 606, a memory or a storage unit 608, and a transceiver or communication unit 610.

The display unit 602 may display a UI on the display portion of the electronic device 100. For example, the electronic device 100 may invoke the UI based on a gesture of the user tapping a bottom of the display portion. For example, the UI may include the first and second menus 104 and 106, as shown in FIG. 1A.

The display unit 604 may be configured as a touch screen as a display panel and a touch pad form a layer structure. Here, the touch screen may perform functions of the input unit 604.

The input unit 604 may detect a first input and a second input on the display portion of the electronic device 100. For example, the first input may be an input of selecting a first candidate parameter from among the first parameters 108 included in the first menu 104, as shown in FIG. 1A. The second input may be an input of selecting a second candidate parameter from among the second parameters 110 included in the second menu 106.

In detail, the input unit 604 may detect the first input on the first menu 104 including the first parameters 108, as shown in FIG. 1A. The first input may be an input of selecting the first candidate parameter from among the first parameters 108. The first input may include, for example, a touch gesture, a swipe gesture, and a hover gesture on the first candidate parameter included in the first parameters 108.

Also, the input unit 604 may detect the second input on any one of the first and second menus 104 and 106.

The second input on the first or second menu 104 or 106 may be an input of selecting the second candidate parameter from among the second parameters 110 included in the second menu 106.

According to an embodiment of the present disclosure, the second input may be an input on the first menu 104. Here, the second input on the first menu 104 may be, for example, rotating the first menu 104. The second candidate parameter may be selected from among the second parameters 110 displayed on the second menu 106 by rotating the first menu 104.

According to another embodiment of the present disclosure, the second input may be an input on the second menu 106. Here, the second input on the second menu 106 may include, for example, a touch gesture, a swipe gesture, or a hover gesture with respect to the second candidate parameter included in the second parameters 110.

The controller 606 may be configured to display a plurality of items. For example, the controller 606 may be configured to display a set of candidate items based on the first input on the first menu 104, as shown in FIG. 1A, and the second input on any one of the first and second menus 104 and 106. According to an embodiment of the present disclosure, the controller 606 may arrange a plurality of candidate items from the set of candidate items in at least one group. According to an embodiment, the set of candidate items may be displayed on the first menu 104. According to another embodiment, of the present disclosure the set of candidate items may be displayed on the second menu 106.

According to an embodiment of the present disclosure, the user may provide a touch input on the first menu 104 including alphabet letters corresponding to an application installed in the electronic device 100. The controller 606 may receive the touch input of the user. The touch input on the first menu 104 may be referred to as the first input. The touch input on the first menu 104 may be an input of selecting one of the alphabet letters included in the first menu 104.

The controller 606 may receive an input of rotating the first menu 104 after the touch input on the first menu 104. The input of rotating the first menu 104 may be referred to as the second input. The input of rotating the first menu 104 may correspond to an input of selecting one of the numbers included in the second menu 106. The first input on the first menu 104 and the second input on the first menu 104 will be described in detail below with reference to FIGS. 9A through 9D.

According to another embodiment of the present disclosure, the controller 606 may receive the second input on the second menu 106 after the touch input on the first menu 104. For example, the electronic device 100 may receive a second touch input on the second menu 106 including numbers after a first touch input on one of the alphabet letters included in the first menu 104. The second touch input may be an input of selecting one of the numbers. The first input on the first menu 104 and the second input on the second menu 106 will be described in detail below with reference to FIGS. 12A through 12C.

The controller 606 may be configured to display the set of candidate items based on the first input on the first menu 104. For example, after an input of selecting an alphabet letter, the controller 606 may show all applications starting with the selected alphabet letter based on a swipe gesture heading towards the center of the display portion. The first input on the first menu 104 will be described in detail below with reference to FIGS. 14A through 14D.

The storage unit 608 may store a plurality of items. The storage unit 608 may include at least one computer-readable recording medium. The storage unit 608 may include a non-volatile storage medium. For example, the storage unit 608 may include a magnetic hard disk, an optical disk, a floppy disk, a flash memory, or an electrically programmable read-only memory (EPROM), or an electrically erasable and programmable read-only memory (EEPROM). Also, in some embodiments, the memory or storage unit 608 may be considered to be a non-transitory storage medium. The term "non-transitory" may indicate that the storage medium is not embodied in a carrier wave or a propagated signal. However, the term "non-transitory" should not be interpreted that the storage unit 608 is non-movable. In some embodiments, the storage unit 608 may be configured to store larger amounts of information than a memory. According to an embodiment, a non-transitory storage medium may store data that may, over time, change (for example, in random access memory (RAM) or cache).

In addition, the transceiver or communication unit 610 may be configured for communicating between internal units and with an external device via one or more networks, such as one or more wireless networks.

Figure 7:
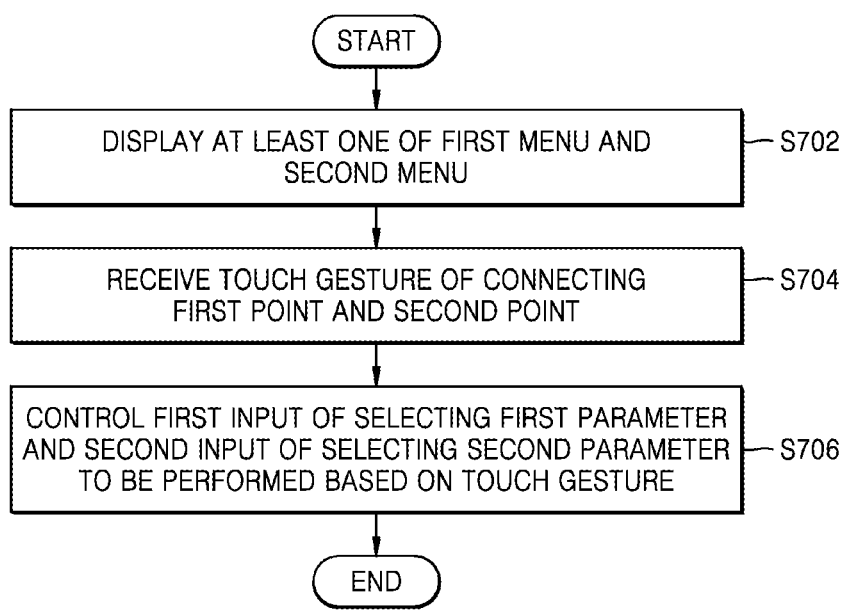
FIG. 7 is a flowchart of a method of displaying a plurality of items, according to various embodiments of the present disclosure.

FIG. 7 is a flowchart of a method of displaying a plurality of items, according to various embodiments of the present disclosure.

Referring to FIG. 7, in operation S702, the electronic device 100 may display at least one of a first menu and a second menu. Here, the first and second menus may have circular shapes that are concentric to each other.

In operation S704, the electronic device 100 may receive a touch gesture of connecting a first point and a second point. The first point may be a location corresponding to one of a plurality of parameters included in the first menu. Also, the second point may be a location corresponding to one of a plurality of parameters included in the second menu related to the first menu.

In operation S706, the electronic device 100 may control a first input of selecting a first parameter and a second input of selecting a second parameter to be performed based on the touch gesture.

Figure 8:
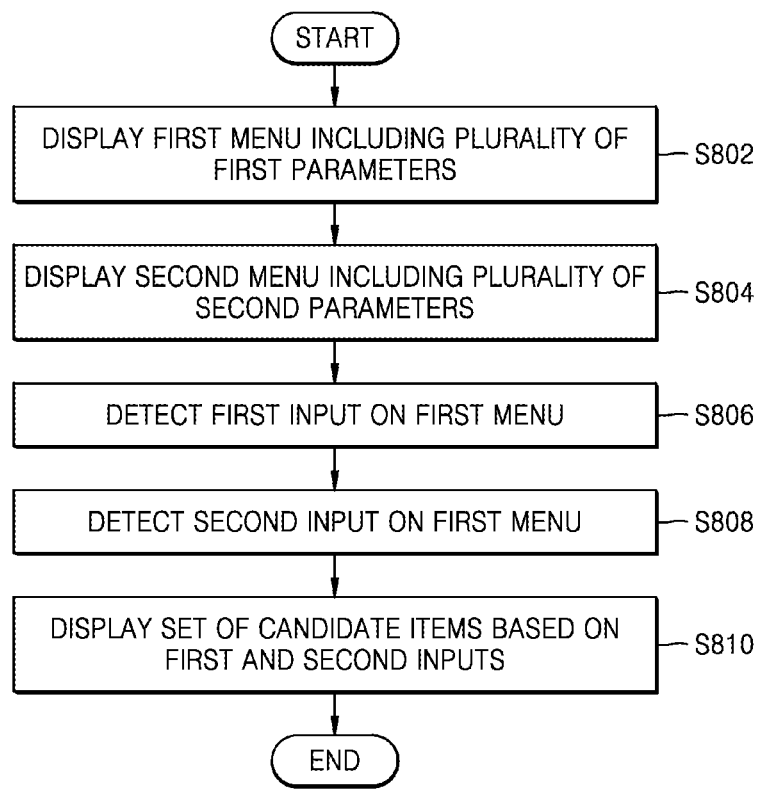
FIG. 8 is a flowchart of a method of displaying a plurality of items, according to various embodiments of the present disclosure.

FIG. 8 is a flowchart of a method of displaying a plurality of items, according to various embodiments of the present disclosure.

Referring to FIG. 8, in operation S802, the electronic device 100 (shown at least in FIG. 1) may display a first menu including a plurality of first parameters.

In operation S804, the electronic device 100 may display a second menu including a plurality of second parameters.

In operation S806, the electronic device 100 may detect a first input on the first menu. In detail, the electronic device 100 may detect the first input on the first menu including the first parameters. The first input may be an input of selecting a first candidate parameter from among the first parameters.

In operation S808, the electronic device 100 may detect a second input on the first menu. The second input on the first menu may be an input of selecting a second candidate parameter from among the second parameters included in the second menu. According to an embodiment, the second input may be an input of rotating the first menu. The rotation of the first menu causes the second candidate parameter to be selected from among the second parameters included in the second menu. According to an embodiment of the present disclosure, the second parameters may correspond to items available in the electronic device 100, and may be dynamically displayed on the second menu.

In operation S810, the electronic device 100 may display a set of candidate items based on the first and second inputs. According to an embodiment of the present disclosure, the set of candidate items may be arranged in one group. According to another embodiment, the set of candidate items may be included in at least one of the first and second menus. The first and second inputs regarding the first menu of the electronic device 100 will be described in detail below with reference to FIGS. 9A through 10D.

FIGS. 9A, 9B, 9C, and 9D illustrate an example of displaying an icon regarding an application starting with an English alphabet letter "C" based on a first input and a second input in a clockwise direction, according to various embodiments of the present disclosure. Instead of English alphabet letters, other letters or characters (e.g., Korean Hangul alphabet letters or Chinese characters) can be used.

Figure 9A:
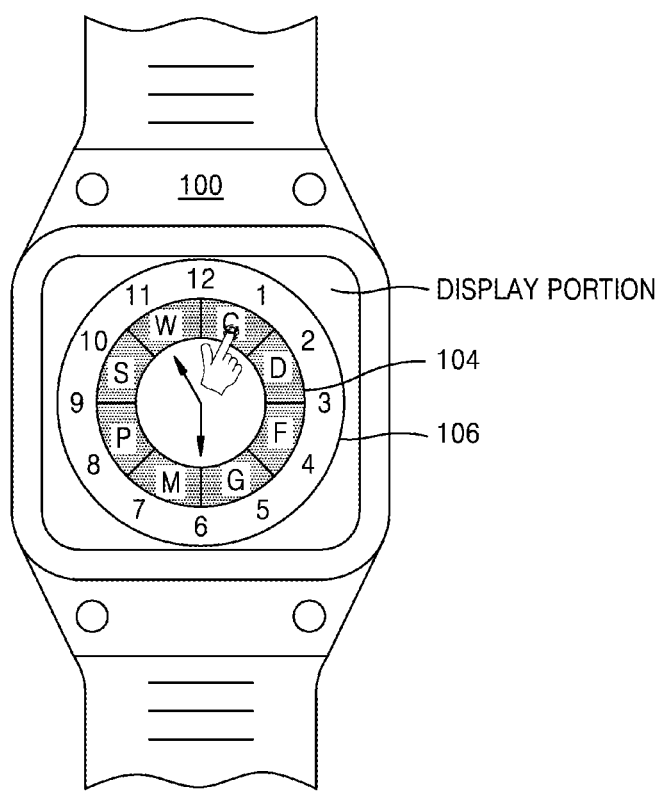
FIGS. 9A, 9B, 9C, and 9D illustrate an example of displaying an icon regarding an application starting with an alphabet letter "C" based on a first input and a second input in a clockwise direction, according to various embodiments of the present disclosure.

Referring to FIG. 9A, the electronic device 100 may be a wearable device. Here, the wearable device may be a watch including a communication function, a display function, and a data processing function.

According to an embodiment, the electronic device 100 may receive a first input on the first menu 104 and a second input in a clockwise direction. Referring to FIG. 9A, the electronic device 100 may receive the first input that is a touch input of selecting an alphabet letter "C" included in the first menu 104.

Figure 9B:
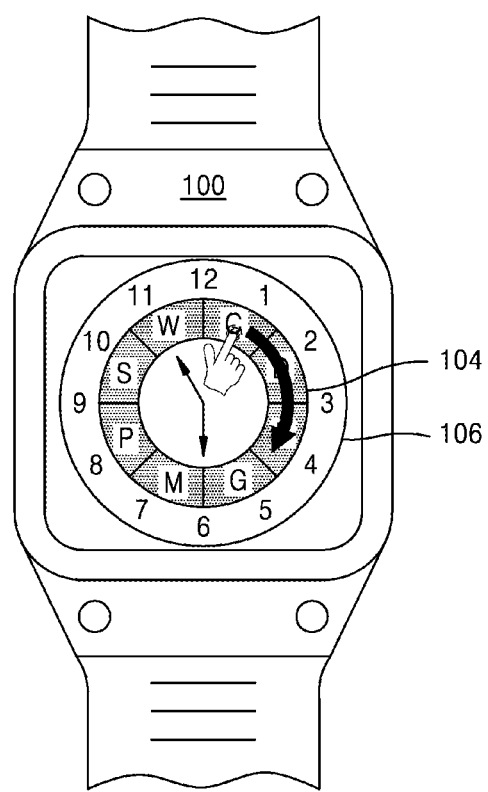

Referring to FIG. 9B, the electronic device 100 may receive the second input that is a rotation input on the first menu 104. The rotation input on the first menu 104 may be a touch input for rotating the first menu 104 in a clockwise direction.

Figure 9C:
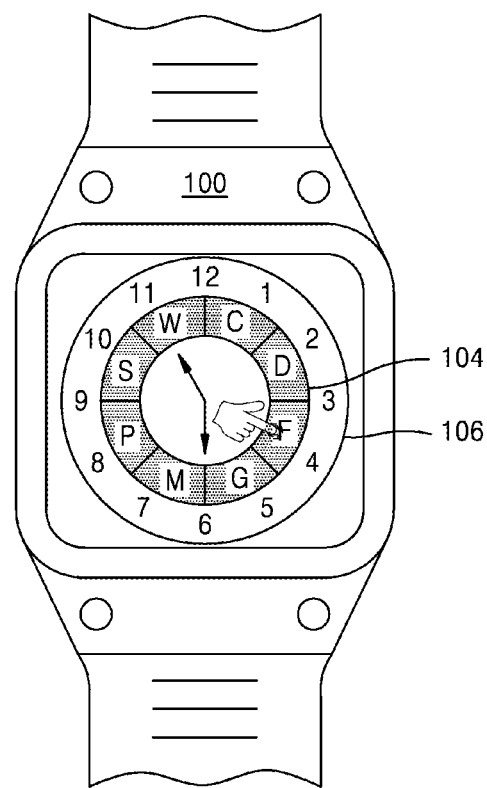

Referring to FIG. 9C, the rotation input on the first menu 104 may be an input of selecting the number "4" included in the second menu 106. After detecting the touch input of selecting the alphabet letter "C", the electronic device 100 may receive the rotation input on the first menu 104.

Figure 9D:
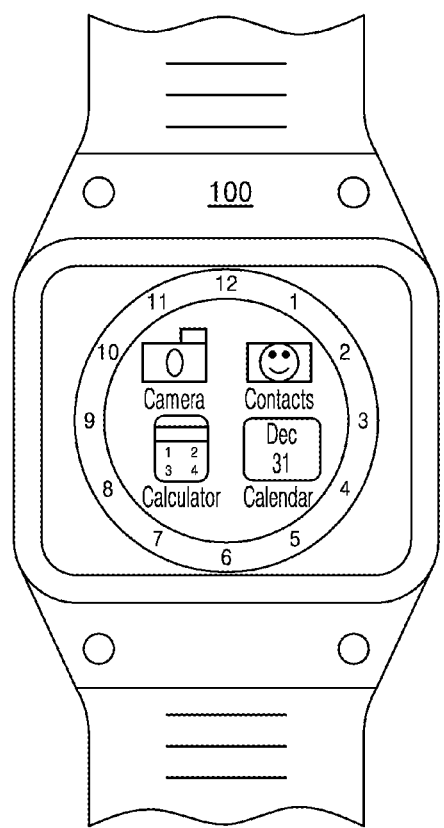

Referring to FIG. 9D, the electronic device 100 may display icons of applications starting with the alphabet letter "C" based on the rotation input on the first menu 104. For example, the electronic device 100 may display icons of four applications starting with the alphabet letter "C". The applications starting with the alphabet letter "C" may include a camera application, a contacts application, a calculator application, and a calendar application.

FIGS. 10A, 10B, 10C, and 10D illustrate an example of displaying an icon regarding an application starting with an alphabet letter "C" based on a first input and a second input in a counterclockwise direction, according to various embodiments of the present disclosure.

Figure 10A:
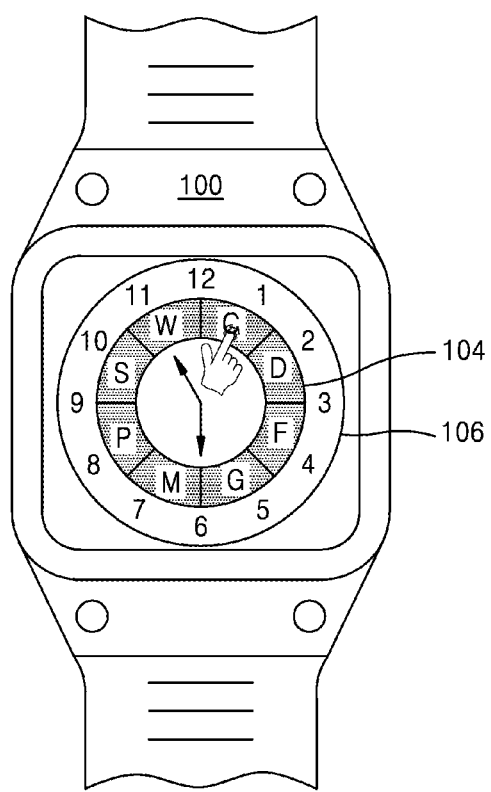
FIGS. 10A, 10B, 10C, and 10D illustrate an example of displaying an icon regarding an application starting with an alphabet letter "C" based on a first input and a second input in a counterclockwise direction, according to various embodiments of the present disclosure.

According to an embodiment, the electronic device 100 may receive a first input on the first menu 104 and a second input in a counterclockwise direction. Referring to FIG. 10A, the electronic device 100 may receive the first input that is a touch input of selecting an alphabet letter "C" included in the first menu 104.

Figure 10B:
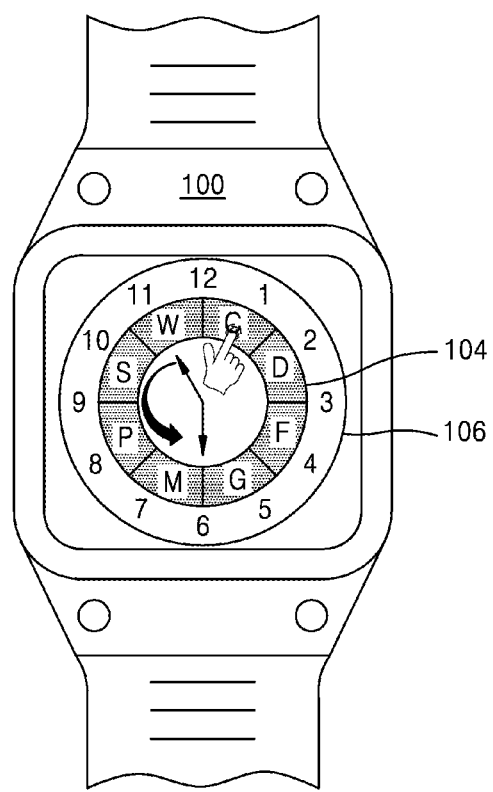

Referring to FIG. 10B, the electronic device 100 may receive the second input that is a rotation input on the first menu 104. The rotation input on the first menu 104 may be a touch input of rotating the first menu 104 in a counter-clockwise direction.

Figure 10C:
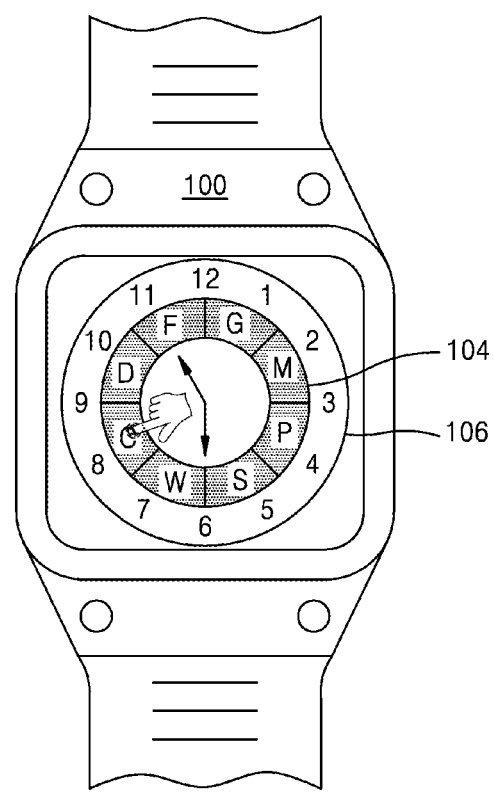

Referring to FIG. 10C, the rotation input on the first menu 104 may be an input of selecting the number "8" included in the second menu 106. After detecting the touch input of selecting the alphabet letter "C", the electronic device 100 may receive a rotation input on the first menu 104.

Figure 10D:
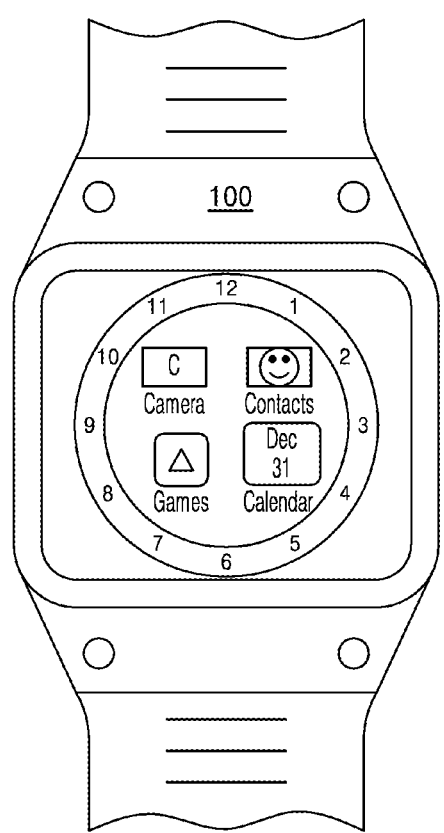

Referring to FIG. 10D, the electronic device 100 may display icons of applications starting with the alphabet letter "C" based on the rotation input on the first menu 104. For example, the electronic device 100 may display icons of eight applications starting with the alphabet letter "C". The applications starting with the alphabet letter "C" may include an SNS-1 application, an SNS-2 application, an SNS-3 application, a Game-1 application, a Game-2 application, a Game-3 application, a contacts application, and a calendar application. It may be difficult for the electronic device 100 to display the icons of all eight applications on one page. Thus, the electronic device 100 may display an icon of a category group including applications in the same category. Referring to FIG. 10D, the electronic device 100 may display an icon of an "SNS sources" category including icons of the SNS-1, SNS-2, and SNS-3 applications. Also, the electronic device 100 may display an icon of a "Games" category including icons of the Game-1, Game-2, and Game-3 applications.

Figure 11:
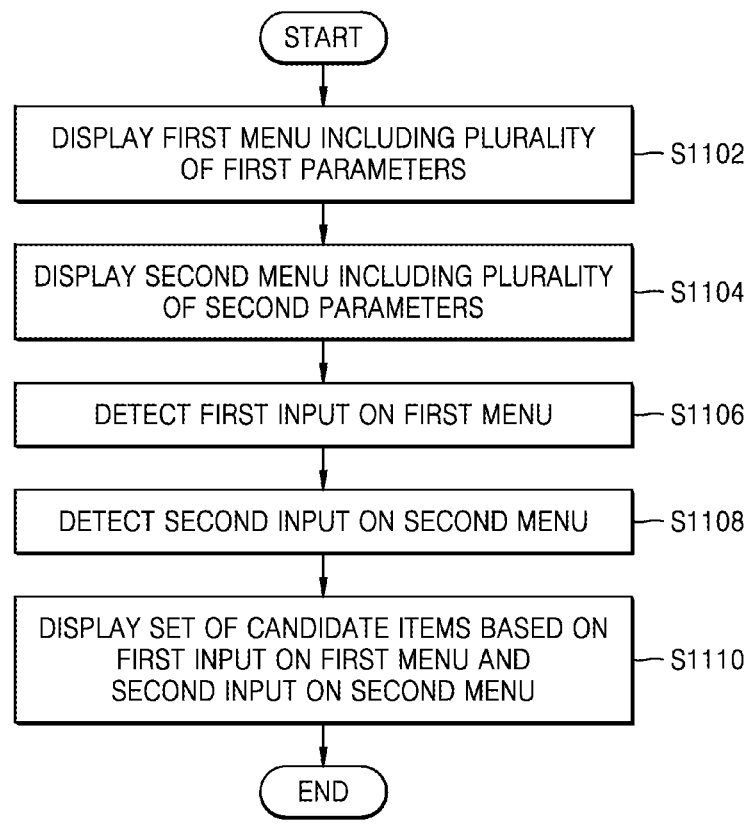
FIG. 11 is a flowchart of a method of displaying a plurality of items when a first input is provided to a first menu and a second input is provided to a second menu, according to various embodiments of the present disclosure.

FIG. 11 is a flowchart of a method of displaying a plurality of items when a first input is provided to a first menu and a second input is provided to a second menu, according to various embodiments of the present disclosure.

Referring to FIG. 11, in operation S1102, the electronic device 100 may display a first menu including a plurality of first parameters.

In operation S1104, the electronic device 100 may display a second menu including a plurality of second parameters.

In operation S1106, the electronic device 100 may detect a first input on the first menu. In detail, the electronic device 100 may detect the first input on the first menu including the plurality of first parameters. The first input may be an input of selecting a first candidate parameter from among the first parameters.

In operation S1108, the electronic device 100 may detect a second input on the second menu. The second input on the second menu may be an input of selecting a second candidate parameter from among the second parameters included in the second menu. According to an embodiment, the second input may be an input of rotating the first menu. The rotation of the first menu causes the second candidate parameter to be selected from among the second parameters included in the second menu.

In operation S1110, the electronic device 100 may display a set of candidate items based on the first input on the first menu and the second input on the second menu. The first input on the first menu and the second input on the second menu of the electronic device 100 will be described in detail below with reference to FIGS. 12A through 12C.

Figure 12A:
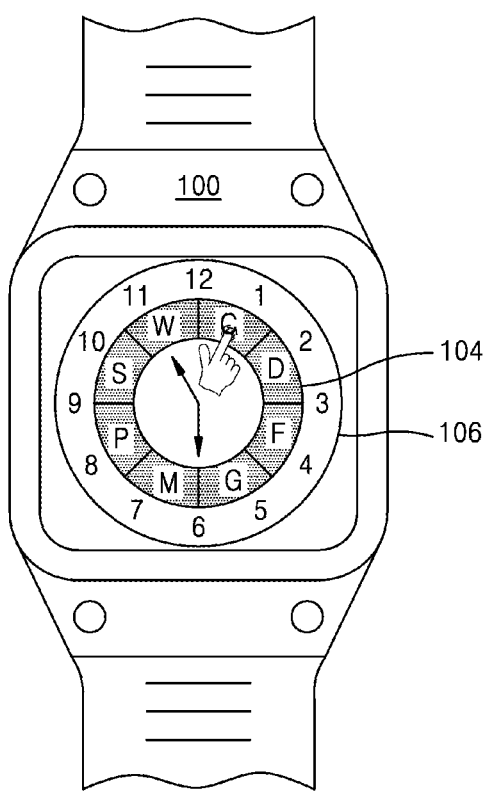
FIGS. 12A, 12B, and 12C illustrate an example of displaying an icon regarding an application starting with an alphabet letter "C" based on a first input provided to a first menu and a second input provided to a second menu, according to various embodiments of the present disclosure.
Figure 12B:
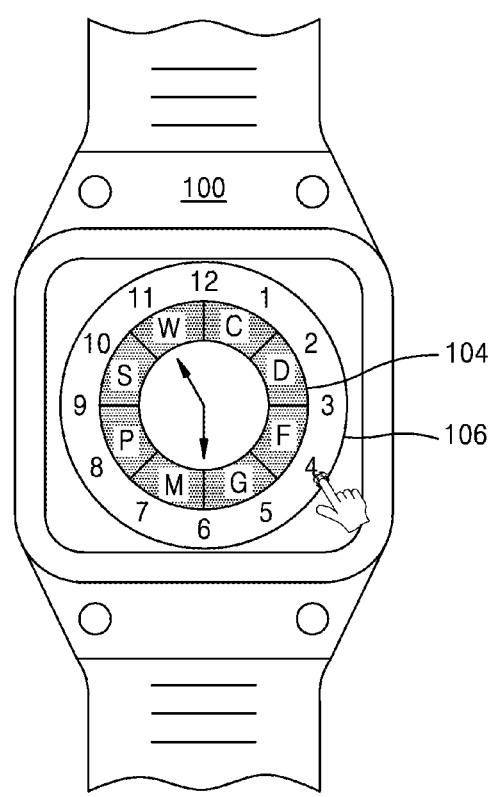
Figure 12C:
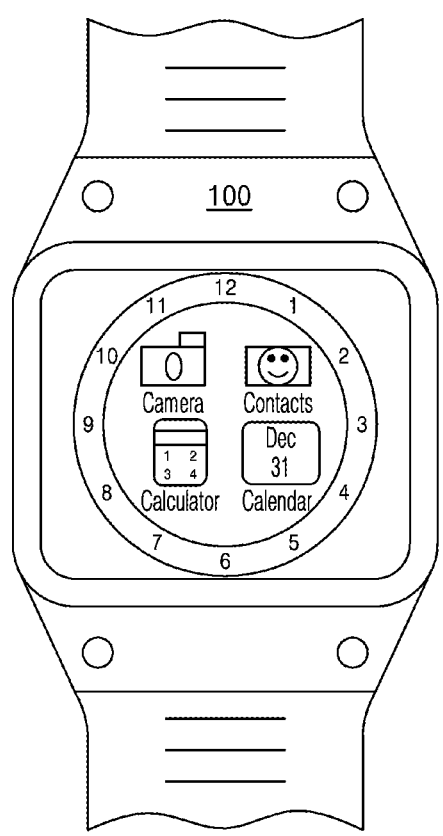

FIGS. 12A, 12B, 12C, and 12C illustrate an example of displaying an icon regarding an application starting with an alphabet letter "C" based on a first input provided to the first menu 104 and a second input provided to the second menu 106, according to various embodiments of the present disclosure.

Referring to FIG. 12A, the electronic device 100 may display the UI 102 including the first and second menus 104 and 106 on the display portion.

Further referring to FIG. 12A, the electronic device 100 may receive a first touch input that is a touch input of selecting a parameter included in the first menu 104. For example, the electronic device 100 may receive the first touch input that is a touch input of selecting an alphabet letter "C" included in the first menu 104. The electronic device 100 may receive a second touch input that is a touch input of selecting a parameter included in the second menu 106.

Referring to FIG. 12B, the electronic device 100 may receive the second touch input that is a touch input of selecting the number "4" included in the second menu 106.

Referring to FIG. 12C, the electronic device 100 may display icons of four applications starting with the alphabet letter "C" (e.g., applications for a calculator, calendar, camera, and contacts), based on the first touch input on the first menu 104 and the second touch input on the second menu 106. Similarly, the electronic device 100 may display icons of applications starting with another alphabet letter.

Figure 13:
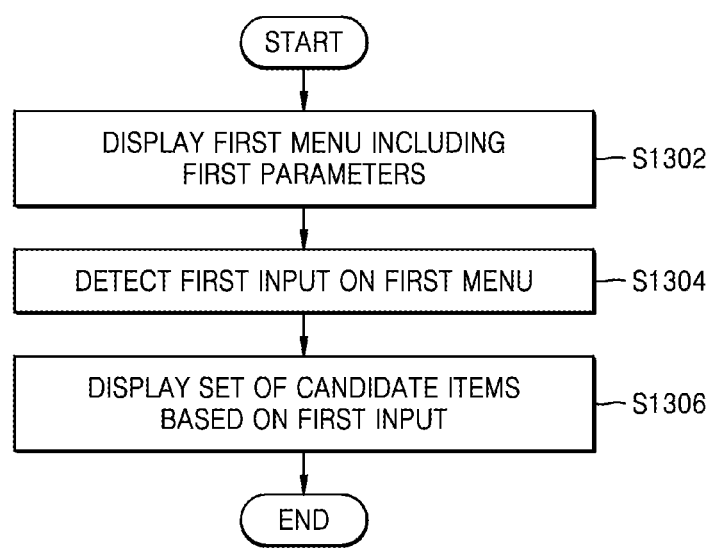
FIG. 13 is a flowchart of a method of displaying a plurality of items of an electronic device when a first input is provided to a first menu, according to various embodiments of the present disclosure.

FIG. 13 is a flowchart of a method of displaying a plurality of items of the electronic device 100 (shown at least in FIG. 1) when a first input is provided to a first menu, according to various embodiments of the present disclosure.

Referring to FIG. 13, in operation S1302, the electronic device 100 may display a first menu including first parameters.

In operation S1304, the electronic device 100 may detect a first input on the first menu. The first input may select a first candidate parameter from among the first parameters. According to an embodiment, the electronic device 100 may dynamically display the first parameters included in the first menu.

In operation S1306, the electronic device 100 may display a set of candidate items based on the first input. The first input on the first menu of the electronic device 100 will be described in detail with reference to FIGS. 14A through 14D.

FIGS. 14A, 14B, 14C, and 14D illustrate an example of displaying an icon regarding an application starting with an alphabet letter "W" based on a first input provided to a first menu, according to various embodiments of the present disclosure.

Figure 14A:
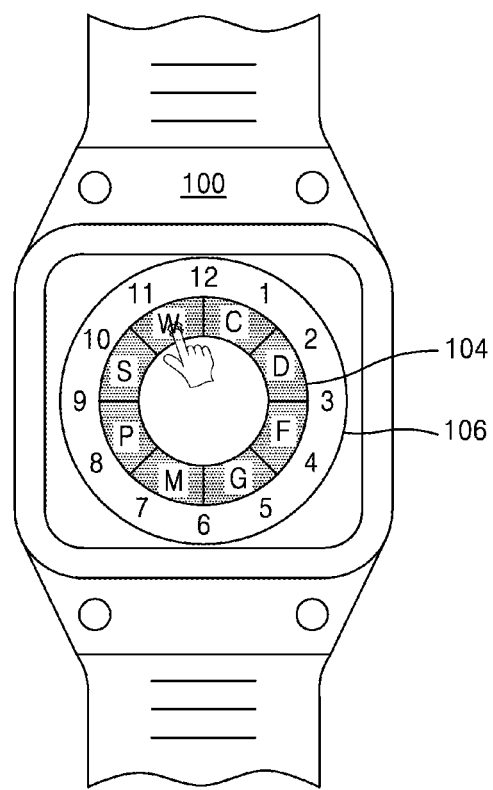
FIGS. 14A, 14B, 14C, and 14D illustrate an example of displaying an icon regarding an application starting with an alphabet letter "W" based on a first input provided to a first menu, according to various embodiments of the present disclosure.

Referring to FIG. 14A, the electronic device 100 may display the first menu 104 including a plurality of alphabet letters and the second menu 106 including numbers. The electronic device 100 may receive a first input. The first input may be an input of selecting one of the alphabet letters included in the first menu 104. Also, the first input may be an input of selecting one of the alphabet letters included in the first menu 104 and swiping into the display portion.

Figure 14B:
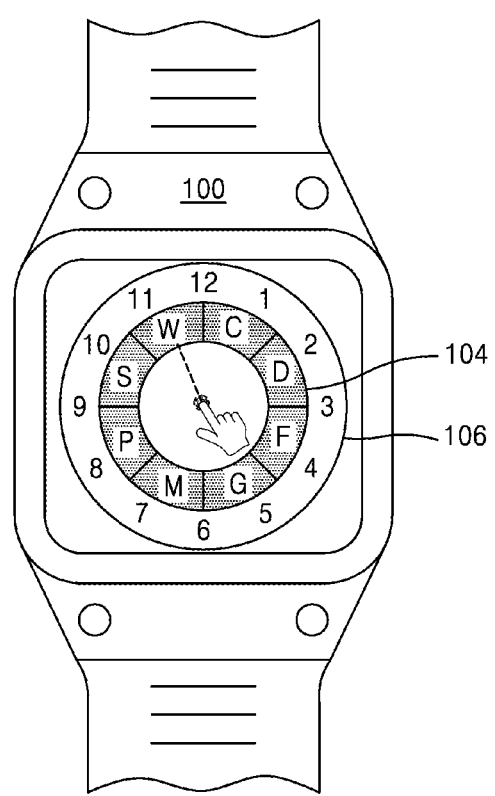

Referring to FIG. 14B, the electronic device 100 may receive an input of touching an alphabet letter "W" included in the first menu 104 and swiping into the display portion.

Figure 14C:

Referring to FIG. 14C, the electronic device 100 may display applications starting with the alphabet letter "W" based on the first input on the first menu 104 (e.g., an application for a word processor).

Figure 14D:
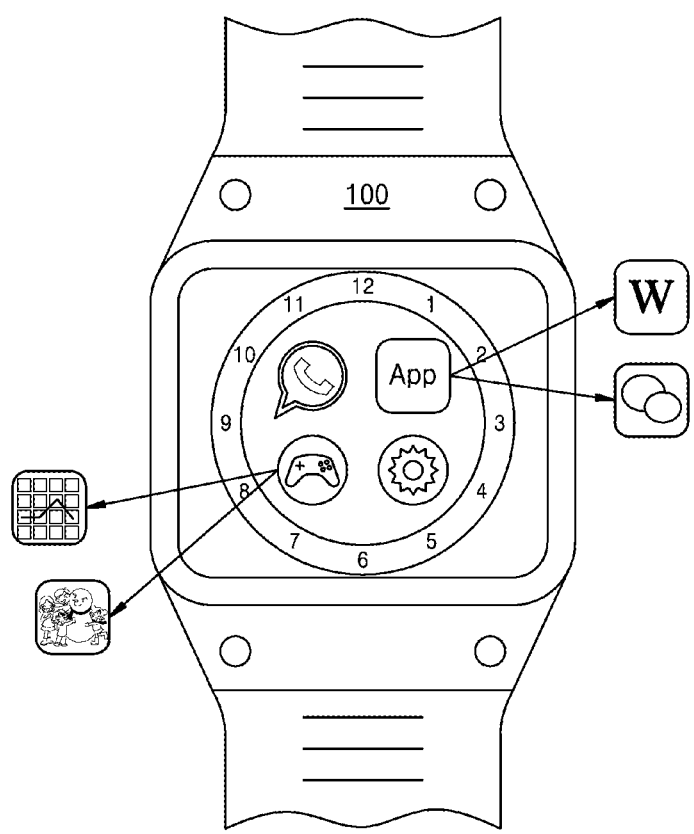

Referring to FIG. 14D, the electronic device 100 may display an icon of a category group including applications in the same category. Examples of the category group include "application" (App), "game", and "settings".

It may be difficult for the electronic device 100 to display all icons of a pre-set number of applications on one page, if the display or display unit is relatively small, such as in a smart watch. For example, the electronic device 100 may have the display portion having a size suitable to display four icons. The electronic device 100 may display icons of applications having high priorities, together with icons of category groups. For example, referring to FIG. 14D, icons of two applications having highest priorities and icons of two category groups are displayed together.

Figure 15A:
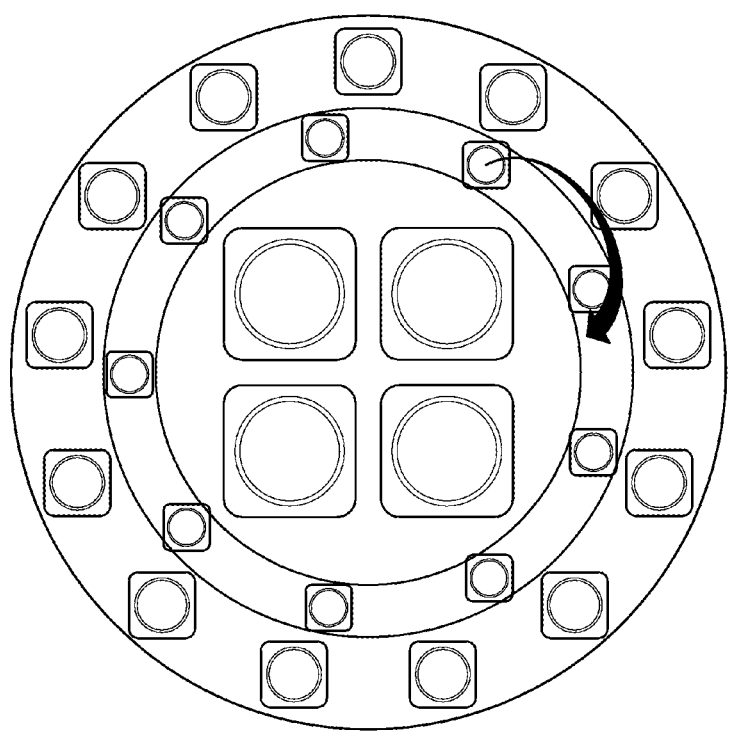
FIGS. 15A and 15B illustrate an example of displaying grouped application icons included in a first menu and a second menu, according to various embodiment of the present disclosure.
Figure 15B:
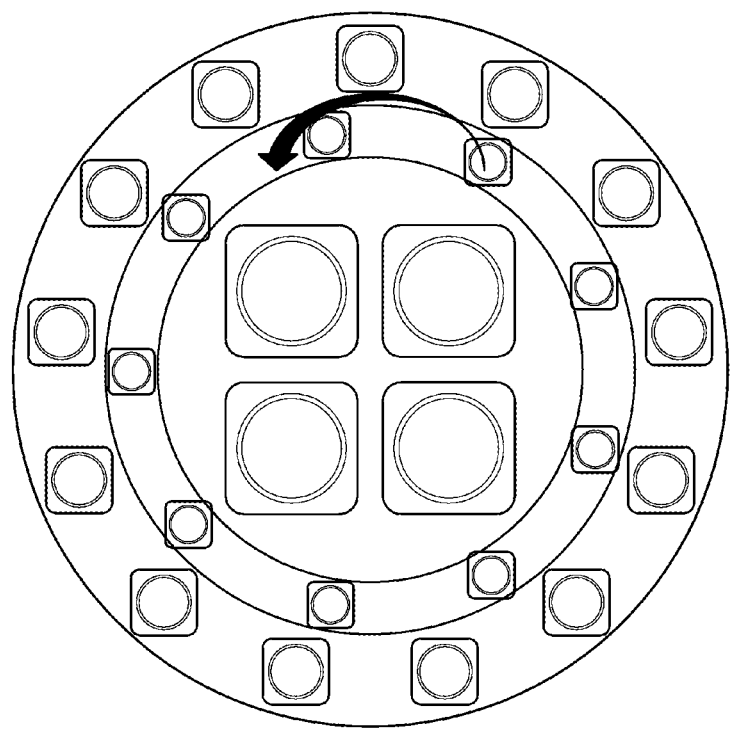

FIGS. 15A and 15B illustrate an example of displaying grouped application icons included in a first menu and a second menu, according to various embodiments of the present disclosure.

The grouped application icon is an icon representing applications included in the same category. For example, the grouped application icon may include a game icon, a settings icon, and an SNS icon.

According to an embodiment, applications included in a game category may be grouped. When the number of applications exceeds the number of applications displayable on the display portion, applications starting with an alphabet letter "W" may be grouped based on types of the applications. Icons of applications may be displayed on the first menu. When a space for displaying the icons of the applications on the first menu is not sufficient, the icons may also be displayed on the second menu.

Referring to FIG. 15A, the electronic device 100 may enlarge and display four icons from a first icon included in the first menu in a clockwise direction, based on a clockwise swipe gesture regarding the first icon.

Also, referring to FIG. 15B, the electronic device 100 may enlarge and display four icons from the first icon included in the first menu in a counterclockwise direction, based on a counterclockwise swipe gesture regarding the first icon.

FIGS. 16A through 16D illustrate an example of executing a favorite application starting with an alphabet letter "F" based on a tap gesture of a user, according to various embodiments of the present disclosure.

Figure 16A:
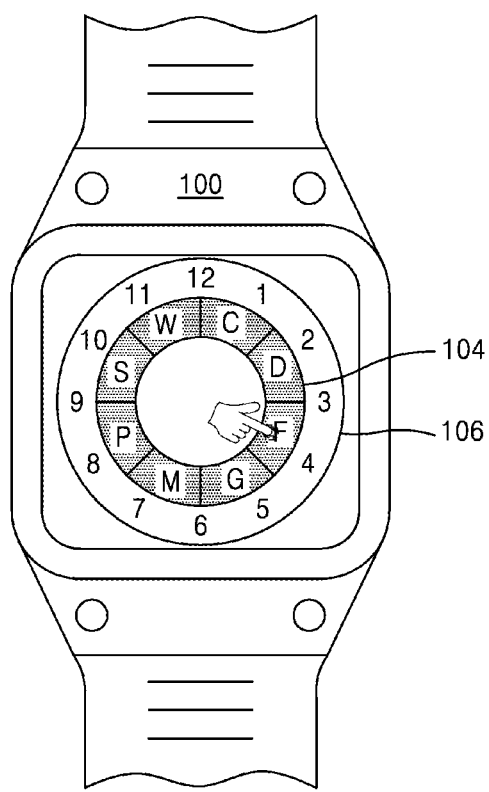
FIGS. 16A, 16B, 16C, and 16D illustrate an example of executing a favorite application starting with an alphabet letter "F" based on a tap gesture of a user, according to various embodiments of the present disclosure.

Referring to FIG. 16A, the electronic device 100 may execute an application starting with an alphabet letter "F" based on a gesture of tapping the alphabet letter "F" included in the first menu 104. In detail, the electronic device 100 may execute user's most favorite application starting with the alphabet letter "F" based on a gesture of tapping the alphabet letter "F" included in the first menu 104.

Figure 16B:
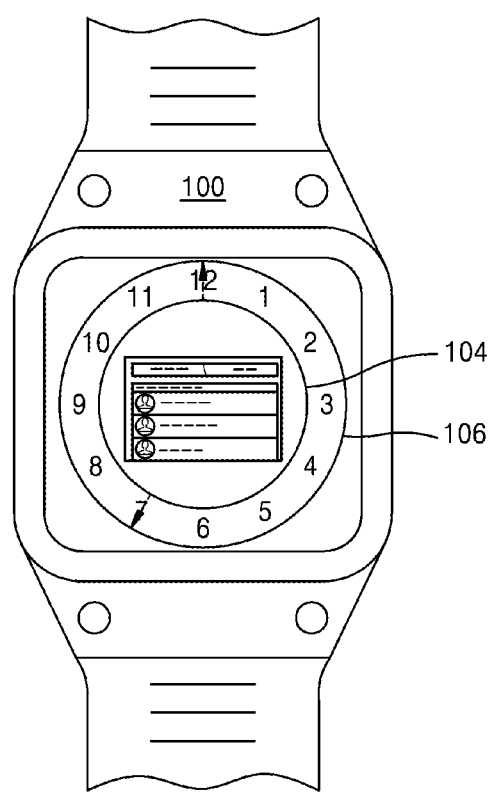

Also referring to FIG. 16B, the electronic device 100 may display an application execution screen based on a gesture of tapping an alphabet letter. Also, the electronic device 100 may not display the first menu 104 while the application execution screen is displayed.

Further referring to FIG. 16B, the electronic device 100 may display at least parts of hands of a clock displayed before the application execution screen was displayed, while displaying the application execution screen.

Figure 16C:
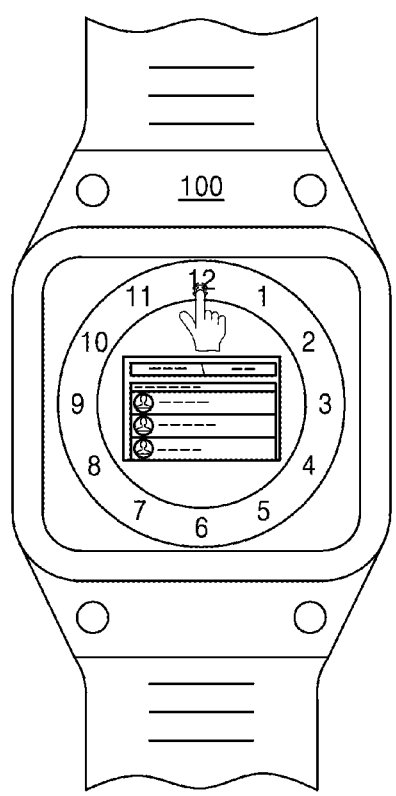
Figure 16D:
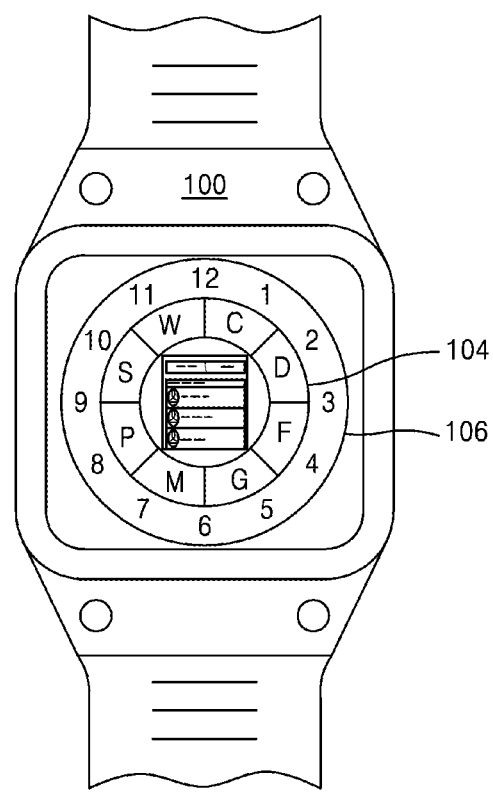

Referring to FIGS. 16C and 16D, the electronic device 100 may again display the first menu 104 based on a tap gesture regarding the display portion while displaying the application execution screen.

Figure 17A:
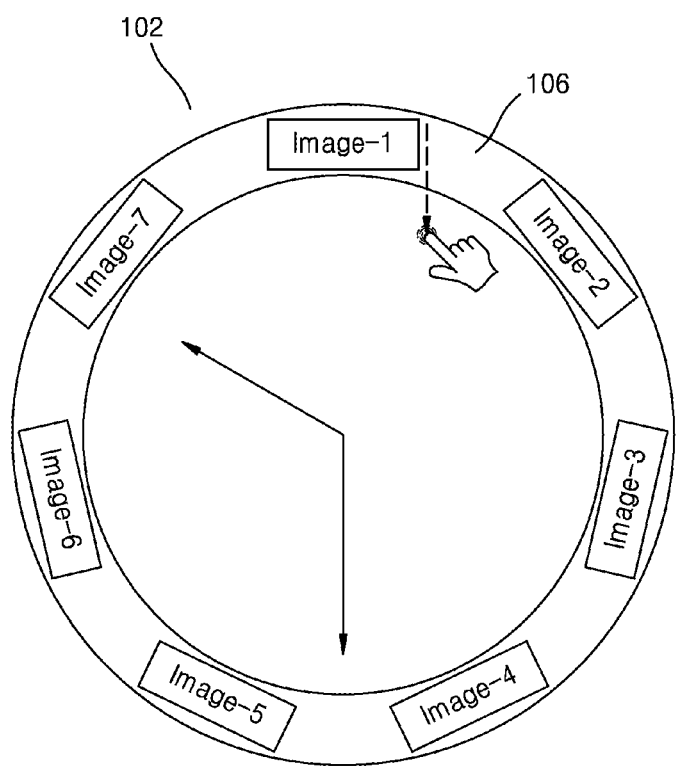
FIGS. 17A, 17B, and 17C illustrate an example of controlling a first menu based on a swipe gesture of a user, according to various embodiments of the present disclosure.
Figure 17B:
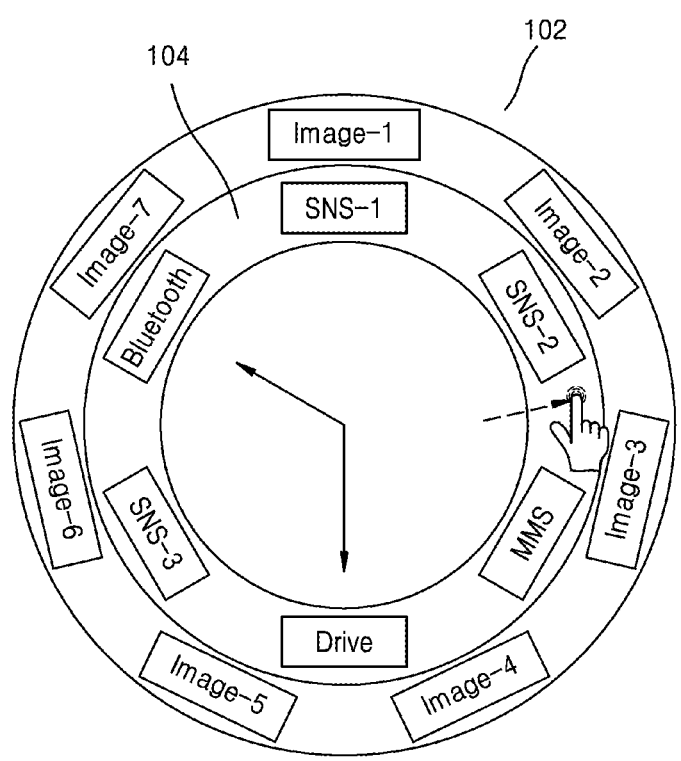
Figure 17C:
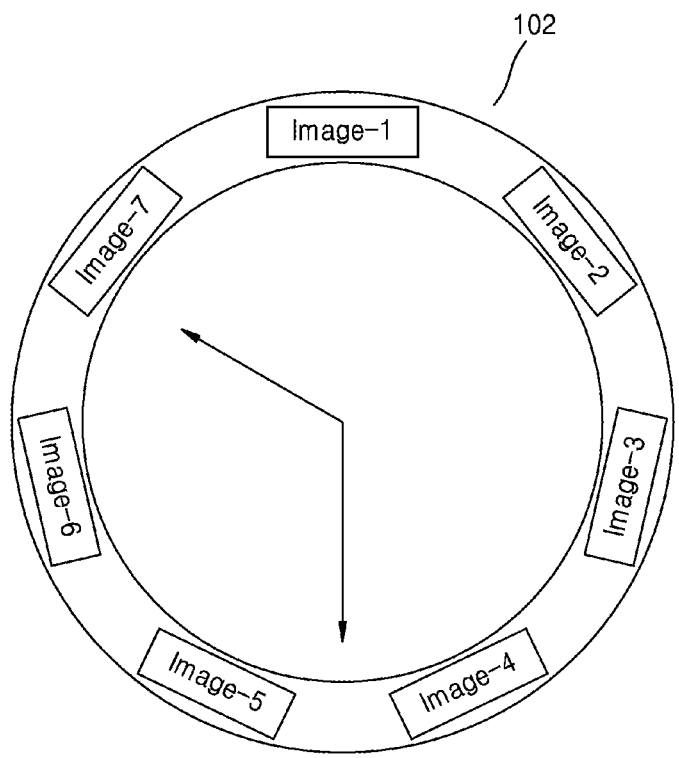

FIGS. 17A, 17B, and 17C illustrate an example of controlling the first menu 104 based on a swipe gesture of a user, according to various embodiments of the present disclosure.

Referring to FIG. 17A, the second menu 106 may include an image. The electronic device 100 may detect a swipe gesture heading inside the UI 102 with respect to the second menu 106.

Referring to FIG. 17B, the electronic device 100 may display the first menu 104 including an SNS-1 application, an SNS-2 application an MMS application, a drive application, an SNS-3 application, and a Bluetooth application based on a swipe gesture with respect to the second menu 106.

Also, referring to FIG. 17C, the electronic device 100 (shown in at least FIG. 1) may not display the first menu 104 including the SNS-1 application, the SNS-2 application, the MMS application, the drive application, the SNS-3 application, and the Bluetooth application, based on a swipe gesture heading outside the UI 102 with respect to the first menu 104.

When an application is executed according to an embodiment, the electronic device 100 may display at least one of the first menu 104 and the second menu 106 including icons of applications related to the executed application. For example, when a camera application is executed, the electronic device 100 may display at least one of the first menu 104 and the second menu 106 including icons of applications related to the camera application, such as an SNS application, a photograph editing application, a message application, and a Wi-Fi application. The electronic device 100 may upload or share a photograph by using an application related to the camera application, which corresponds to one of the icons included in at least one of the first menu 104 and the second menu 106.

According to an embodiment of the present application, the electronic device 100 may display the first and second menus 104 and 106 in an order based on a swipe gesture heading inside the UI 102. For example, the electronic device 100 may display a plurality of menus including the first and second menus 104 and 106, based on a swipe gesture heading to a center of the UI 102. If the swipe gesture detected by the electronic device 100 corresponds to an area of a pre-set first region of the display portion, the electronic device 100 may display the first menu 104 based on the swipe gesture corresponding to the area of the pre-set first region. If the swipe gesture detected by the electronic device 100 corresponds to an area of a second region of the UI 102, wherein the area of the second region is larger than the area of the first region, the electronic device 100 may display all menus including the first and second menus 104 and 106 based on the swipe gesture corresponding to the area of the second region.

Meanwhile, the electronic device 100 may hide the plurality of menus one by one or at once based on a swipe gesture heading outside the UI 102. Also, the electronic device 100 may hide the plurality of menus one by one or at once based on a swipe gesture heading inside the UI 102.

Also, the electronic device 100 may display the plurality of menus and hide the executed application based on a swipe gesture heading outside or inside the UI 102. Also, the electronic device 100 may display the plurality of menus and end at least one of executed applications based on a swipe gesture heading outside or inside the UI 102.

FIGS. 18A, 18B, 18C, and 18D illustrate an example of uploading an image included in the second menu 106 to a SNS application included in the first menu 104, according to various embodiments of the present disclosure.

Figure 18A:
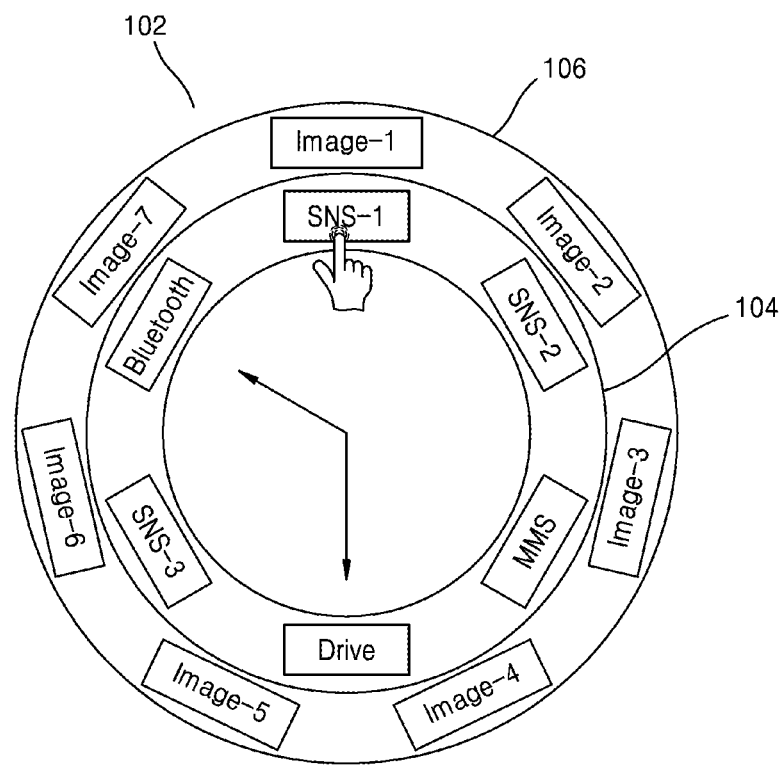
FIGS. 18A, 18B, 18C, and 18D illustrate an example of uploading an image included in a second menu to a social network service (SNS) application included in a first menu, according to various embodiments of the present disclosure.

Referring to FIG. 18A, the electronic device 100 may display the first menu 104 including icons of an SNS-1 application, an SNS-2 application, an MMS application, a drive application, an SNS-3 application, and a Bluetooth application. Also, the electronic device 100 may display the second menu 106 including images.

Figure 18B:
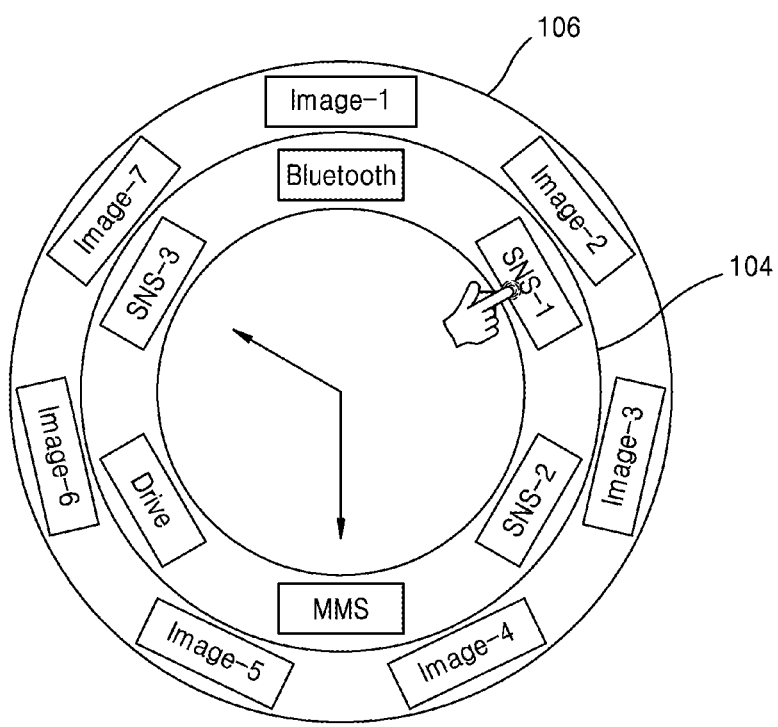

Referring to FIG. 18A, the electronic device 100 may receive an input of selecting the SNS-1 application. Then, referring to FIG. 18B, the electronic device 100 may rotate the first menu 104 in a clockwise direction based on a gesture of a user. As shown in FIG. 18B, one of the image included in the second menu 106 may be enlarged and displayed based on the rotation of the first menu 104. For example, an image corresponding to a gesture input for rotating the first menu 104 in the clockwise direction may be enlarged and displayed.

Referring to FIG. 18B, the electronic device 100 may enlarge and display Image-2 corresponding to an angle the SNS-1 application is rotated.

Figure 18C:
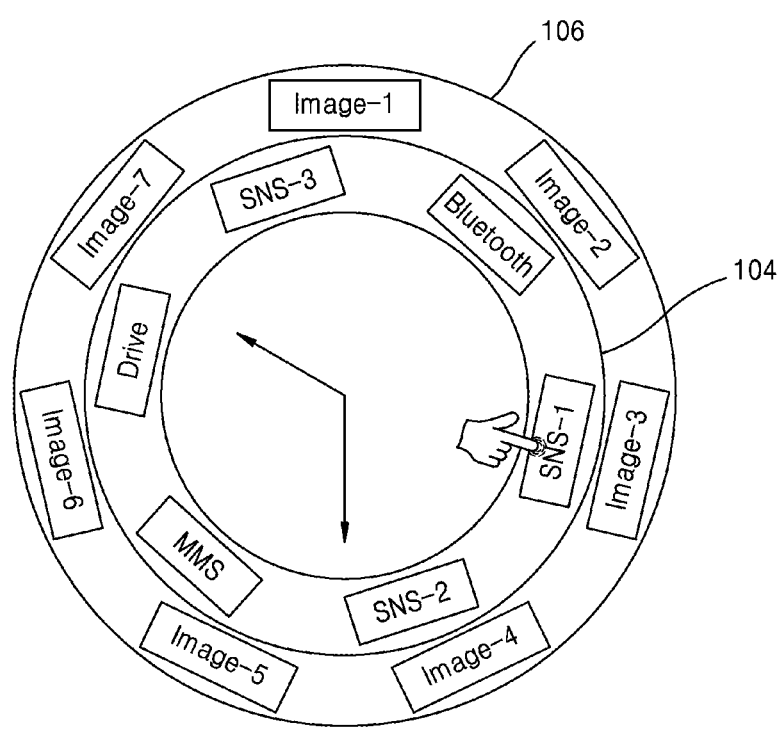

Also, referring to FIG. 18C, the user may rotate the first menu 104 to a location corresponding to Image-3 while touching the SNS-1 application included in the first menu 104. Then, the electronic device 100 may enlarge and display Image-3.

Figure 18D:
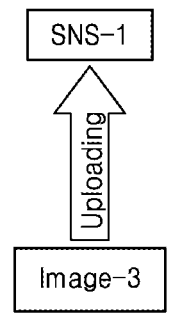

Then, as shown in FIG. 18D, the electronic device 100 may upload Image-3 to the SNS-1 application. For example, the user may upload Image-3 to the SNS-1 application by long-pressing the first menu 104 while the first menu 104 is rotated.

According to another embodiment, the electronic device 100 may rotate the second menu 106 in a clockwise direction based on a gesture of the user. Here, when a location of enlarging and displaying an image is determined in the second menu 106, the user may rotate the second menu 106 until an image desired to be uploaded from among the images included in the second menu 106 is enlarged.

For example, when the SNS-1 application is selected in the first menu 104, the electronic device 100 may upload an enlarged and displayed image to the SNS-1 application by rotating the second menu 106 until an image to be uploaded is enlarged and then long-pressing the second menu 106.

FIGS. 19A, 19B, 19C, and 19D illustrate another example of uploading an image included in the second menu 106 to an SNS application included in the first menu 104, according to various embodiments of the present disclosure.

Figure 19A:
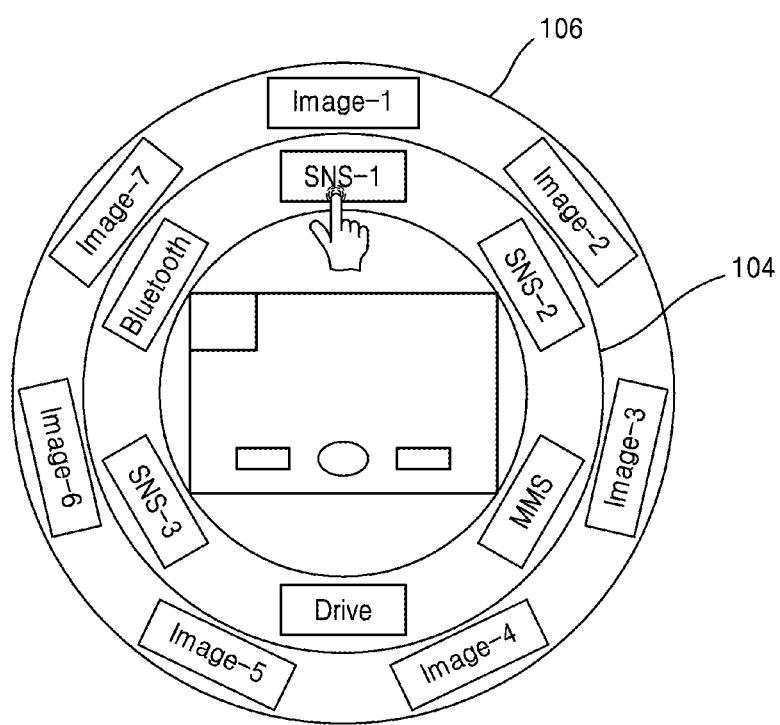
FIGS. 19A, 19B, 19C, and 19D illustrate another example of uploading an image included in a second menu to an SNS application included in a first menu, according to various embodiments of the present disclosure.
Figure 19B:
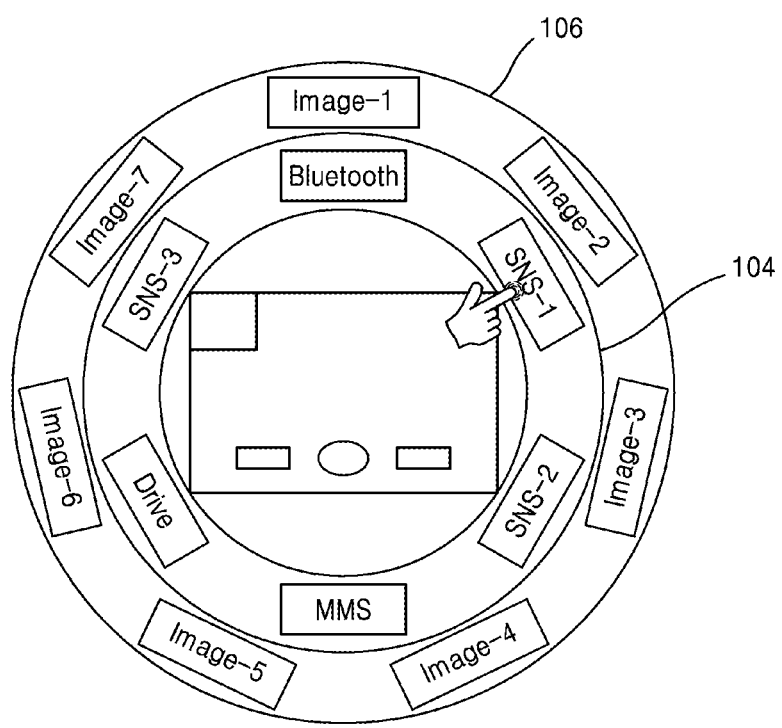
Figure 19C:
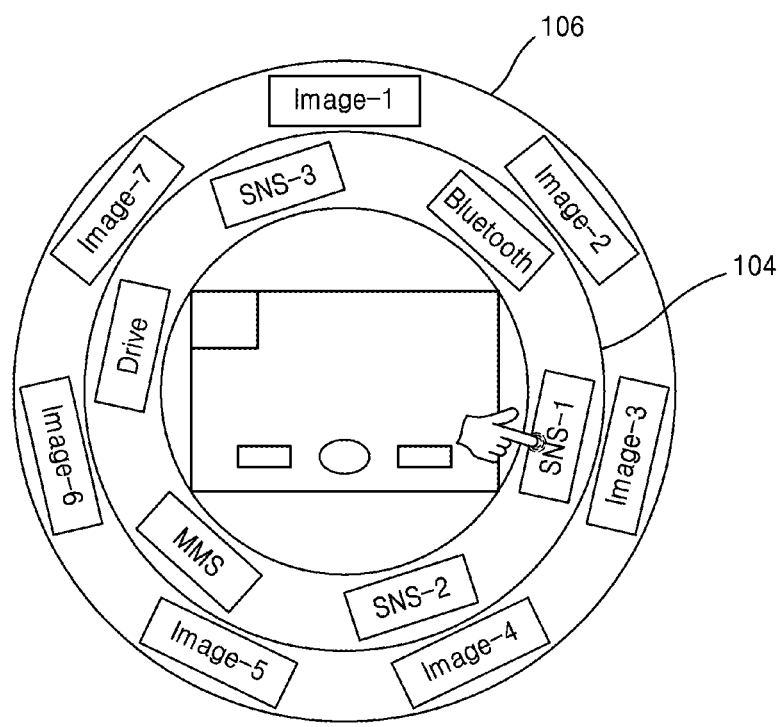
Figure 19D:
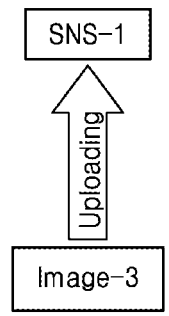

Referring to FIG. 19A, the electronic device 100 may display the first menu 104 including icons of an SNS-1 application, an SNS-2 application, an MMS application, a drive application, an SNS-3 application, and a Bluetooth application, which are applications related to a camera application that is executed. Also, the electronic device 100 may display the first menu 104 including at least one of icons of all applications being executed, a new notification, and an unread notification. For example, when at least a part of a new notification is additionally displayed on the first menu 104, the electronic device 100 may densely arrange icons included in the first menu 104. Also, the electronic device 100 may display the second menu 106 including images captured by the camera application. The electronic device 100 may enlarge and display one of the images captured by the camera application at a center of the display portion.

Figure 20A:
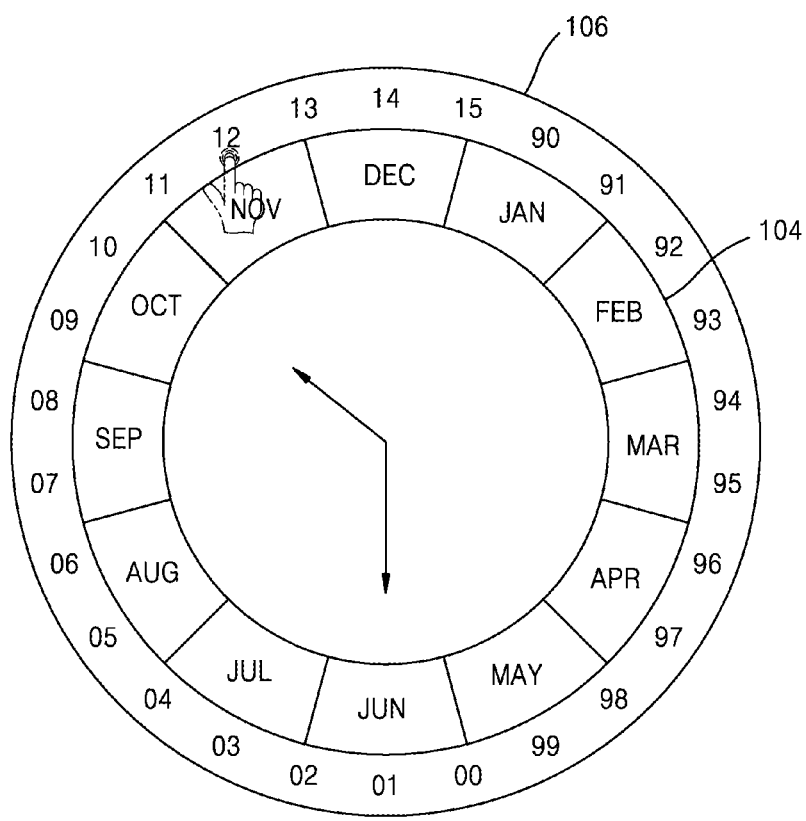
FIGS. 20A, 20B, and 20C illustrate an example of accessing an August 2012 calendar according to various embodiments of the present disclosure.
Figure 20B:
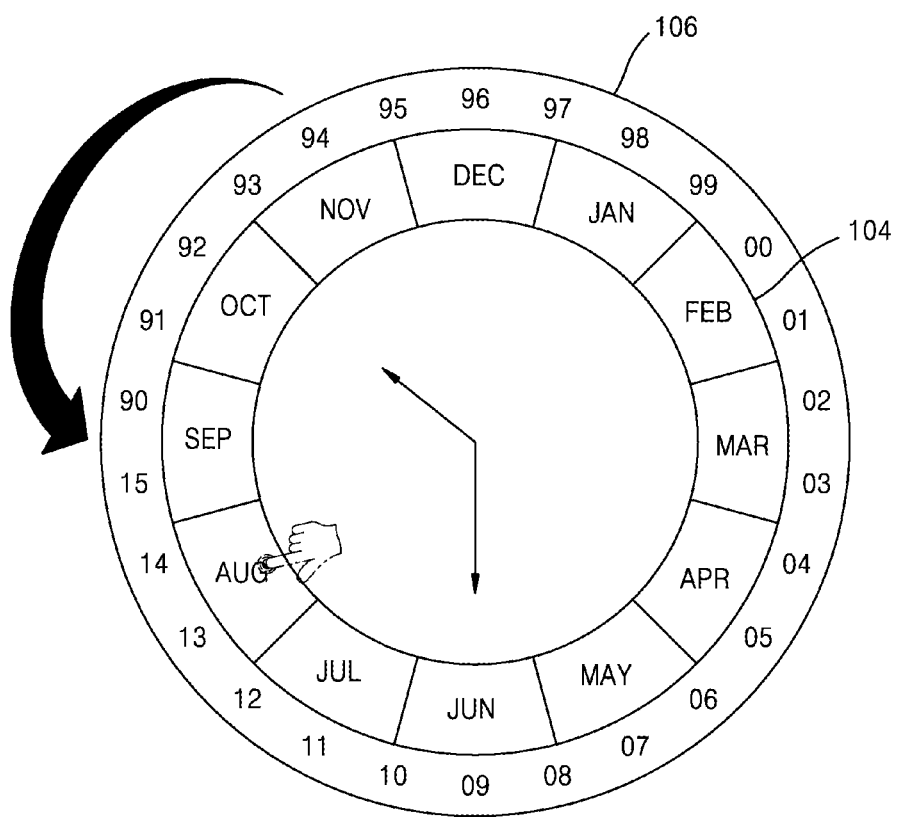
Figure 20C:
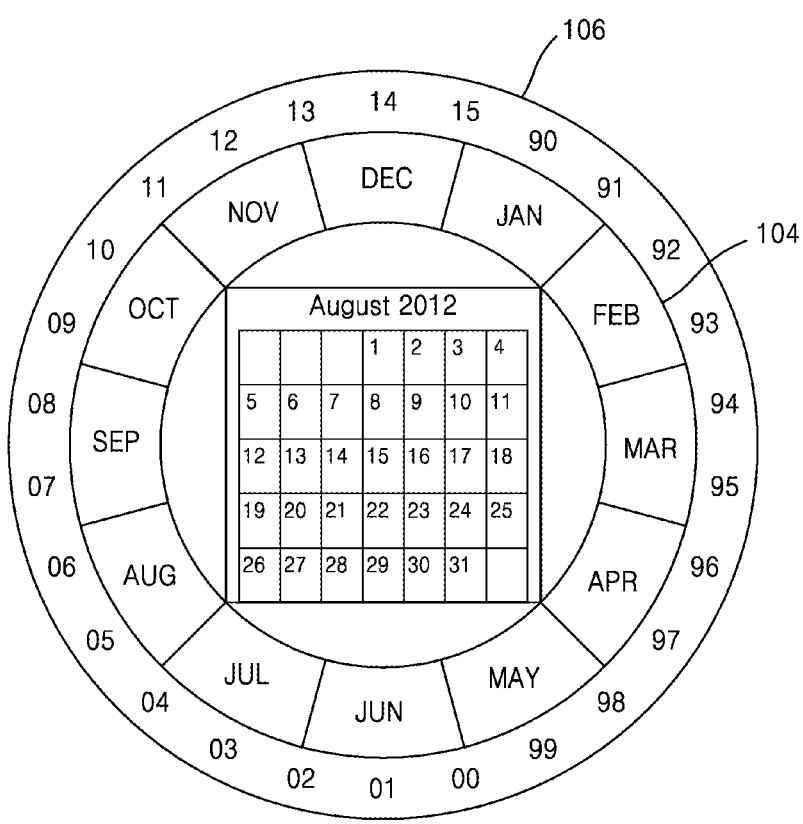

FIGS. 20A, 20B, and 20C illustrate an example of accessing an August 2012 calendar according to various embodiments of the present disclosure.

According to an embodiment, the first menu 104 may not be rotatable and the second menu 106 may be rotatable. Referring to FIG. 20A, the first menu 104 may include from January to December and the second menu 106 may include years. For example, the second menu 106 may include years from 1990 to 2015. The years included in the second menu 106 may be set by a user. The electronic device 100 may receive an input of selecting 2012 with respect to the second menu 106, and then rotate the second menu 106. Referring to FIG. 20B, the electronic device 100 may rotate the second menu 106 until the year 2012 included in the second menu 106 is moved to a location corresponding to "Aug" in the first menu 104. In FIG. 20C, the electronic device 100 displays the days and weeks of August 2012 based on the year 2012 being moved to the location corresponding to "Aug".

Figure 21A:
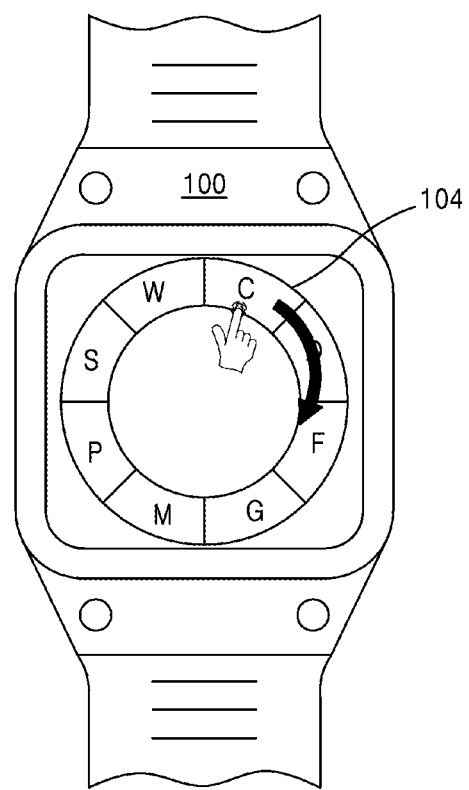
FIGS. 21A, 21B, and 21C illustrate an example of displaying an icon regarding an application starting with an alphabet letter "C" based on a first input and a second input provided to a first menu, according to various embodiments of the present disclosure.
Figure 21B:
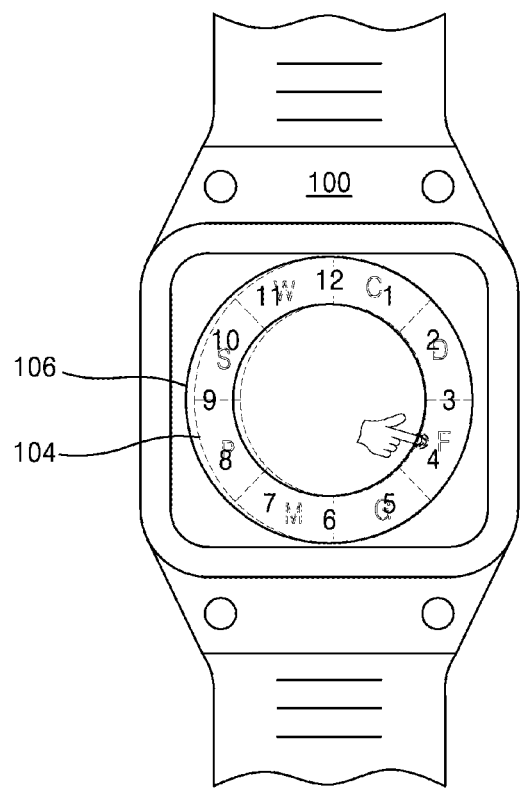
Figure 21C:
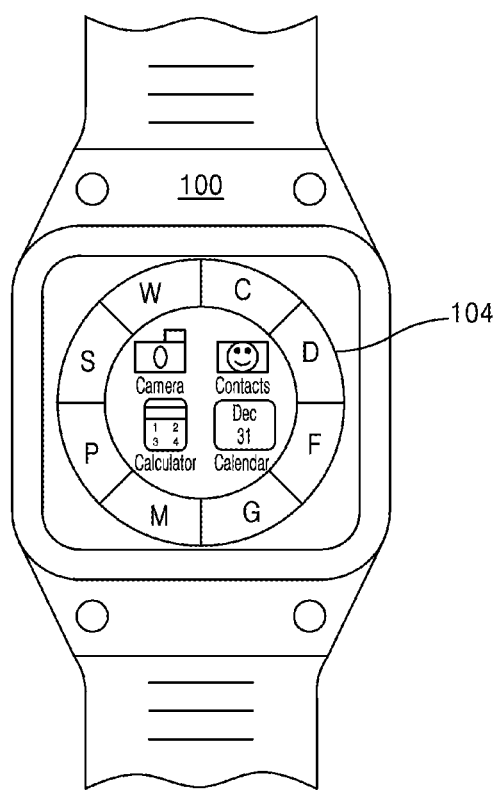

FIGS. 21A, 21B, and 21C illustrate an example of displaying an icon regarding an application starting with an alphabet letter "C" based on a first input and a second input provided to the first menu 104, according to various embodiments of the present disclosure.

The electronic device 100 may display the first menu 104. Also, the electronic device 100 may display the first menu 104 to be layered on the second menu 106. Referring to FIG. 21A, the first menu 104 may include alphabet letters, for example, "W", "C", "D", "F", "G", "M", "P", and "S". In detail, the alphabet letters of the first menu 104 may correspond to the first alphabet letters of names of applications available in the electronic device 100. Also, the second menu 106 hidden by the first menu 104 may include numbers from 1 to 12.

Referring to FIG. 21A, the electronic device 100 may receive an input of selecting an alphabet letter "C" from the alphabet letters included in the first menu 104. Referring to FIG. 21B, after the alphabet letter "C" is selected, the electronic device 100 may display the second menu 106 based on an input of rotating the first menu 104. The electronic device 100 may display the second menu 106 to overlap the first menu 104 or may display the second menu 106 while not displaying the first menu 104, based on the input of rotating the first menu 104.

Referring to FIG. 21B, the electronic device 100 may select one of the numbers included in the second menu 106 based on the input of rotating the first menu 104. For example, the electronic device 100 may select the number "4" from the second menu 106 based on the input of rotating the first menu 104, and after the number "4" is selected, may hide the second menu 106. Referring to FIG. 21C, the electronic device 100 may display icons of a camera application, a contacts application, a calculator application, and a calendar application, which start with the alphabet letter "C", based on the first input of selecting the alphabet letter "C" of the first menu 104 and the second input of selecting the number "4" of the second menu 106.

Figure 22A:
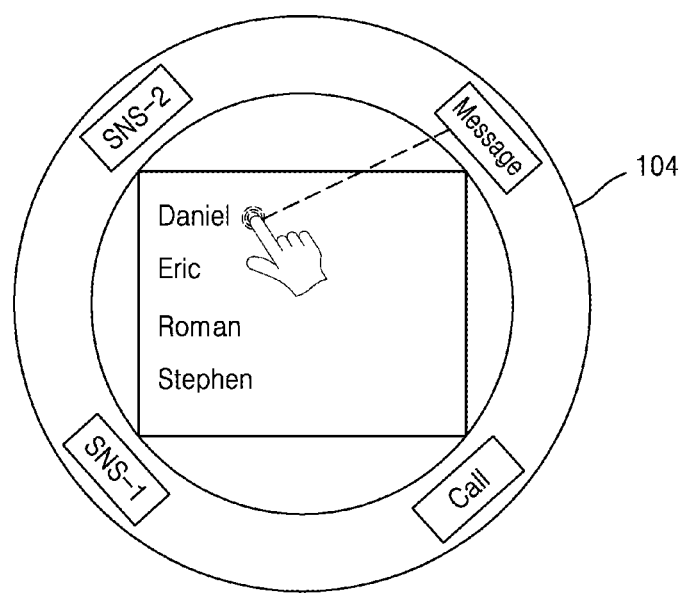
FIGS. 22A and 22B illustrate an example of executing a message application, according to various embodiments of the present disclosure.
Figure 22B:
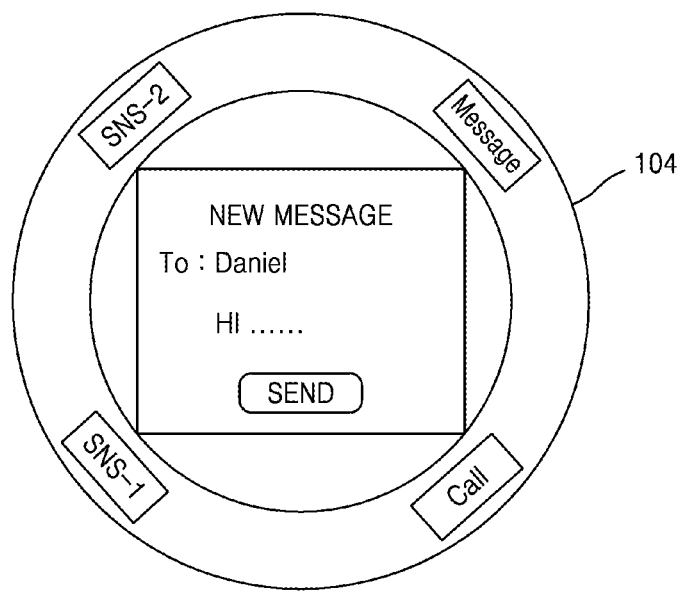

FIGS. 22A and 22B illustrate an example of executing a message application, according to various embodiments of the present disclosure.

The electronic device 100 may display the first menu 104 including icons of a message application, a call application, an SNS-1 application, and an SNS-2 application. Referring to FIG. 22A, a user may select "Daniel" from contacts displayed on the display portion. Also, after selecting "Daniel", the user may drag "Daniel" to the icon of the message application included in the first menu 104.

Referring to FIG. 22B, the electronic device 100 may transmit a message to "Daniel" based on an input of selecting "Daniel" and dragging "Daniel" to the icon of the message application included in the first menu 104. Also, the electronic device 100 may transmit the message to "Daniel" based on an input of selecting "Daniel" from the contacts displayed on the display portion and then selecting the icon of the message application included in the first menu 104.

Figure 23:
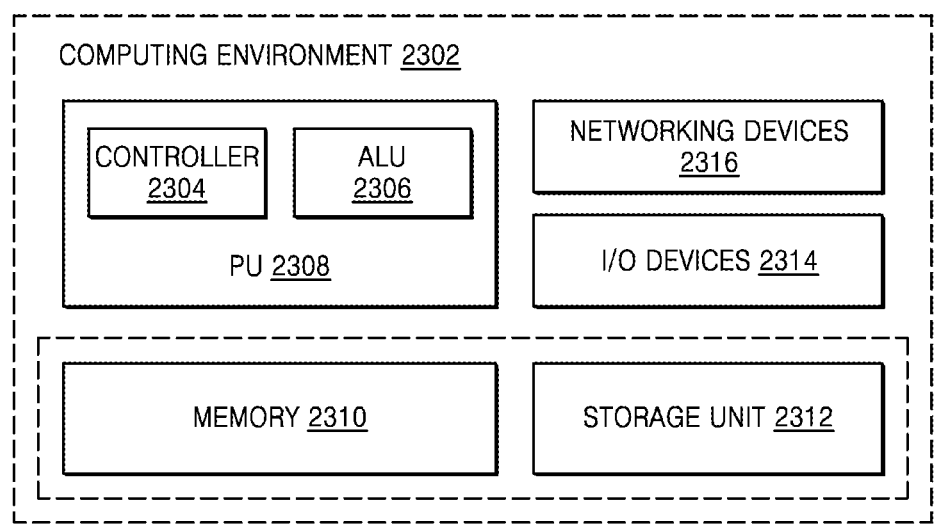
FIG. 23 illustrates a computing environment implementing a method of managing a plurality of items in an electronic device, according to various embodiments of the present disclosure.

FIG. 23 illustrates a computing environment 2302 implementing a method of managing a plurality of items in an electronic device, according to an embodiment of the present disclosure.

Referring to FIG. 23, the electronic device for realizing the method of managing the plurality of items may have the computing environment 2302. The computing environment may include at least one processing unit (PU) 2308 including a controller 2304 and an arithmetic logic unit (ALU), a memory 2310, a storage unit 2312, a plurality of networking devices 2316, and input/output (I/O) devices 2314. The PU 2308 may process instructions of an algorithm In order to process the instructions, the PU 2308 may receive commands from the controller 2304. The arithmetic logic unit ALU may perform logical and arithmetic operations required to execute the instructions.

The computing environment 2302 may include homogeneous and/or heterogeneous cores, different types of central processing units (CPUs), and accelerators. The PUs 2308 may be located on a single chip or a plurality of chips. An algorithm for performing instructions and codes may be stored in at least one of the memory 2310 and the storage unit 2312. When the instructions are performed, the instructions may be read from at least one of the memory 2310 and the storage unit 2312 and performed by the PU 2308.

The plurality of networking devices 2316 and the I/O devices 2314 may be connected to the computing environment 2302 to support implementation of instructions in the computing environment 2302.

Figure 24:
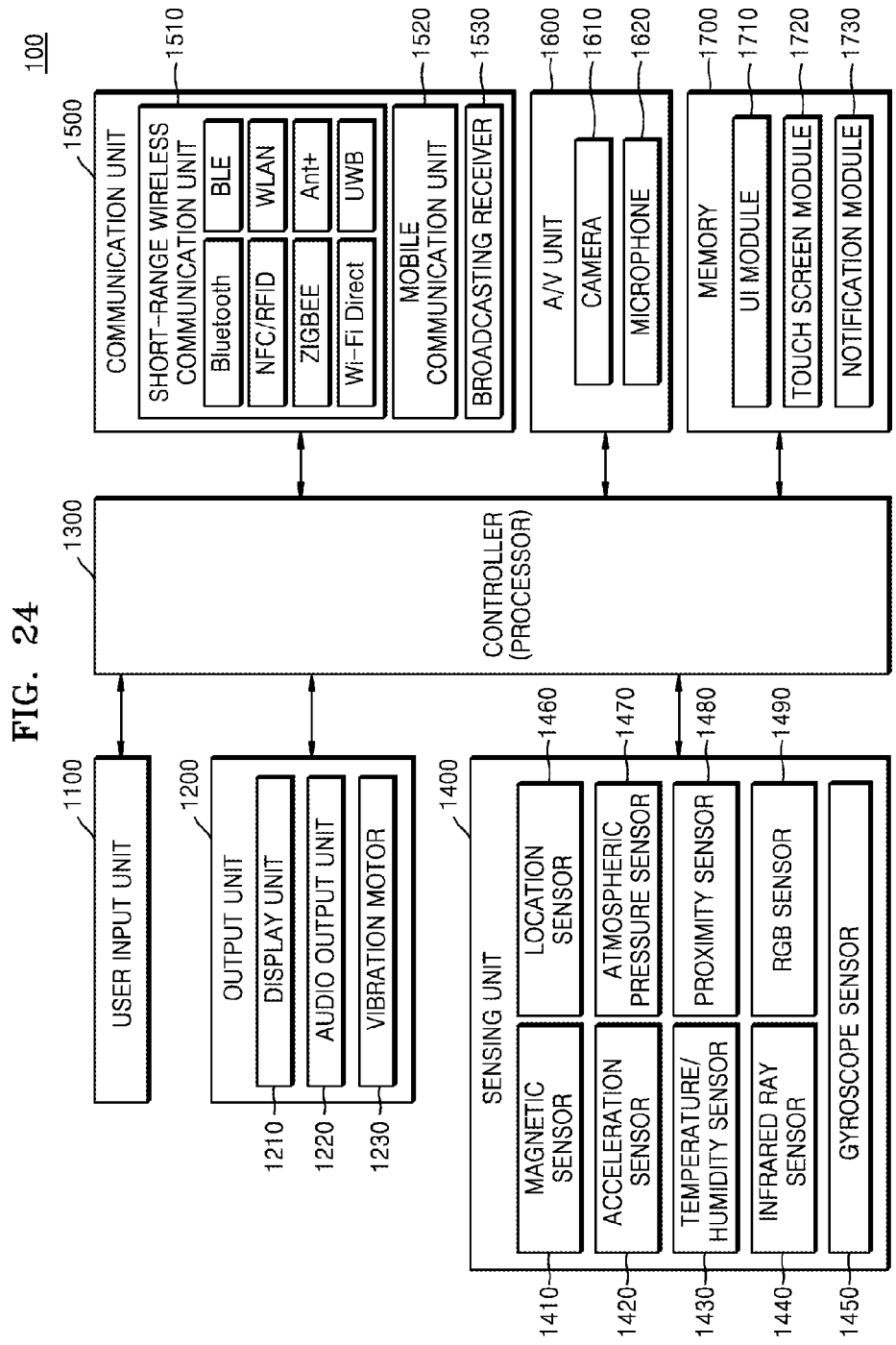
FIG. 24 is a block diagram of an electronic device according to various embodiments of the present disclosure.

FIG. 24 is a block diagram of the electronic device 100 according to various embodiments of the present disclosure.

Referring to FIG. 24, the electronic device 100 according to an embodiment may include a sensing unit 1400, an audio/video (A/V) unit 1600, and a memory 1700 in addition to a user input unit 1100, an output unit 1200, a controller 1300, and a communication unit 1500.

The user input unit 1100 may denote a tool by which the user inputs data to control the electronic device 100. For example, the user input unit 1100 may include a key pad, a dome switch, a touch pad (a contact type capacitive method, a pressure-type resistive method, an infrared ray detection method, a surface ultrasonic conductivity method, an integral equation type tension measurement method, a piezo-electric effect method, etc.), a jog wheel, a jog switch, etc. However, the embodiment above is merely exemplary and is not limited thereto.

The user input unit 1100 may receive an input of a password from the user. The user input unit 1100 may also receive an input of a type of the password to be inputted by the user.

The output unit 1200 may output an audio signal, a video signal or a vibration signal, and the output unit 1200 may include a display unit 1210, an audio output unit 1220, and a vibration motor 1230.

The display unit 1210 may display information processed in the electronic device 100. For example, the display unit 1210 may display a password hint Also, the display unit 1210 may overlappingly display the password hint and an image including a part of a user's body.

When the display unit 1210 and the touch pad make the touch screen in a layer structure, the display unit 1210 may be used as an input device in addition to as an output device. The display unit 1210 may include at least one of a liquid crystal display, a thin film transistor-liquid crystal display, an organic light-emitting diode, a flexible display, a three-dimensional display, and an electrophoretic display. In addition, the electronic device 100 may include two or more display units 1210 depending on a realization type of the electronic device 100. In this case, two or more display units 1210 may face each other via a hinge.

The display unit 1210 of FIG. 24 may include the display unit 10 described in FIG. 2.

The audio output unit 1220 may output audio data that is received from the communication unit 1500 or stored in the memory 1700. In addition, the audio output unit 1220 may output an audio signal related to functions processed in the electronic device 100a (for example, a call signal receiving sound, a message receiving sound, and a notification sound.) Such audio output unit 1220 may include a speaker, a buzzer, etc.

The vibration motor 1230 may output the vibration signal. For example, the vibration motor 1230 may output the vibration signal corresponding to an output of audio data or video data (for example, the call signal receiving sound, the message receiving sound, etc.) In addition, the vibration motor 1230 may output the vibration signal when a touch is inputted onto the touch screen.

The controller 1300 (which includes at least one processor) may control an overall operation of the electronic device 100. For example, the controller 1300 may generally control the user input unit 1100, the output unit 1200, the sensing unit 1400, the communication 1500, the A/V input unit 1600, etc. by executing programs stored in the memory 1700.

The controller 1300 of FIG. 24 may include the controller 20 described in FIG. 2.

The sensing unit 1400 may detect a status of the electronic device 100 or an ambient status of the electronic device 100, and transfer detected information to the controller 1300.

The sensing unit 1400 may include at least one of a magnetic sensor 1410, an acceleration sensor 1420, a temperature/humidity sensor 1430, an infrared ray sensor 1440, a gyroscope sensor 1450, a location sensor 1460 (for example, a global positioning system (GPS)), an atmospheric pressure sensor 1470, a proximity sensor 1480, and a red-green-blue (RGB) sensor (illuminance sensor) 1490. However, the embodiment above is merely exemplary and is not limited thereto. Since functions of respective sensors may be intuitively inferred, detailed descriptions will be omitted.

The communication unit 1500 may include at least one of components which enable communication between the electronic device 100 and an external device (not illustrated) or between the electronic device 100 and a server (not illustrated). For example, the communication unit 1500 may include a short-range wireless communication unit 1510, a mobile communication unit 1520, and a broadcasting receiver 1530.

The short-range wireless communication unit 1510 may include a Bluetooth communication unit, a Bluetooth low energy (BLE) communication unit, a near field communication/radio frequency identification (NFC/RFID) unit, a wireless local area network (WLAN) or Wireless Fidelity (Wi-Fi) communication unit, a ZigBee communication unit, an infrared data association (IrDA) communication unit, a Wi-Fi Direct (WFD) communication unit, an ultra wideband (UWB) communication unit, an Ant+ communication unit, etc. However, the embodiment above is merely exemplary and is not limited thereto.

The mobile communication unit 1520 may transceive wireless signals to and from at least one of a base station, an external terminal, and a server on a mobile communication network. The wireless signals may include various types of data per transceiving audio call signals, video communication call signals or text/multimedia messages.

The broadcasting receiver 1530 may receive broadcasting signals and/or information related to broadcasting from the outside via broadcasting channels. The broadcasting channels may include satellite channels and ground wave channels. Depending on a type of realization, the electronic device 100 may not include the broadcasting receiver 1530.

The A/V input unit 1600 is configured to input audio signals or video signals, and may include a camera 1610, a microphone 1620, etc. The camera 1610 may acquire image frames such as stationary images or video images via an imaging device at a video call mode or a shooting mode. Images captured by the imaging device may be processed via a controller 1300 or a separate image processor (not illustrated).

The image frames processed in the camera 1610 may be stored in the memory 1700 or transmitted to the outside via the communication unit 1500. Two or more cameras 1610 may be included depending on a type of a terminal.

The microphone 1620 may receive an input of external audio signals and process it into electrical audio data. For example, the microphone 1620 may receive audio signals from the external device or a speaker. The microphone 1620 may use various noise removing algorithms for removing noise which is generated in a process of receiving an input of the external audio signals.

The memory 1700 may store programs for processing and controlling of the controller 1300, and store data also that is inputted into the electronic device 100 or outputted from the electronic device 100.

The memory 1700 may include at least one type of storing media such as a flash memory, a hard disk, a multimedia micro-card, a card type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Programs stored in the memory 1700 may be classified into a plurality of modules per function and may be, for example, a UI module 1710, a touch screen module 1720, a notification module 1730, etc.

The UI module 1710 may provide specialized UI, graphic UI (GUI), etc., which are linked to the electronic device 100 per application. The touch screen module 1720 may sense the user's touch gesture on the touch screen and transmit information about the touch gesture to the controller 1300. According to an embodiment, the touch screen module 1720 may recognize and analyze a touch code. The touch screen module 1720 may be composed of separate hardware including the controller.

According to various embodiments of the present disclosure, various sensors may be arranged inside or near the touch screen for detecting the touch on the touch screen or a close touch. A tactile sensor is an example of a sensor for detecting the touch on the touch screen. The tactile sensor may sense the touch of a particular object at a level of human feeling or at a higher level than that. The tactile sensor may detect various pieces of information such as roughness of a contact surface, hardness of a contact material, and temperature of a contact point.

In addition, the proximity sensor is another example of sensors for detecting the touch on the touch screen. The proximity sensor is a sensor which detects an existence of an object approaching a certain detection surface or an object in the vicinity, without a mechanical contact, via an electromagnetic force or infrared rays. Examples of the proximity sensors are a transparence-type photoelectric sensor, a direct reflection-type photoelectric sensor, a mirror reflection-type photoelectric sensor, a high-frequency oscillation-type proximity sensor, a capacitance-type proximity sensor, a magnet-type proximity sensor, and an infrared ray proximity sensor. Various touch gestures of the user may include a tap, a touch and hold, a double tap, a drag, a fanning, a flick, a drag and drop, a swipe, etc.

The notification module 1730 may generate a signal to notify an event occurrence of the electronic device 100. Examples of events generated in the electronic device 100 may include receiving a call signal, receiving a message, an input of key signals, and a schedule notification. The notification module 1730 may output the notification signal in a video signal-type via the display unit 1210 or in an audio signal-type via the audio output unit 1220, or in a vibration signal-type via the vibration motor 1230.

Meanwhile, one or more embodiments described herein may be realized in a form of a non-transitory computer-readable recording medium storing a command and data executable by a computer. The command may be stored in a form of a program code and when executed by a computer (or processor), generate a certain program module to perform a certain operation. Also, the command may perform certain operations of the embodiments described herein when executed by the processor.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by one of ordinary skill in the art that various changes in form and details may be made therein without departing from the spirit and scope as defined by the following claims.

What is claimed is:

1. An electronic device comprising:
a display; and
at least one processor configured to control for:
displaying at least one of a first menu and a second menu on the display,
receiving a touch gesture connecting a first point and a second point, wherein the first point determines a first parameter that is one of a plurality of parameters indicated in the first menu and the second point determines a second parameter that is one of a plurality of parameters indicated in the second menu related to the first menu,
controlling a first input of selecting the first parameter and a second input of selecting the second parameter to be performed based on the touch gesture, and
displaying, on the display, at least one of a plurality of items based on the first input and the second input,
wherein the first input includes a touch input on the first menu,
wherein the second input includes an input of rotating the first menu after the first input,
wherein the second parameter is selected from among the plurality of parameters included in the second menu by rotating the first menu to move the first parameter in the first menu at a location of the first input to a location corresponding to the second parameter in the second menu,
wherein the second parameter is selected along with the first parameter based on the second input, and
wherein the second parameter is selected with the rotation of the first parameter.

2. The electronic device of claim 1,
wherein the first menu and the second menu have circular shapes, and
wherein the plurality of parameters included in the first menu and the second menu are provided along the circular shapes.

3. The electronic device of claim 2, wherein the at least one processor is further configured to control for moving locations of the plurality of parameters included in the first menu in a clockwise direction or a counterclockwise direction along the circular shape, based on the touch gesture.

4. The electronic device of claim 3, wherein the touch gesture comprises a drag gesture connecting the first point included in the first menu and the second point in a curve.

5. The electronic device of claim 1, wherein the at least one processor is further configured to control for:
displaying the first menu to hide the second menu or displaying the second menu to hide the first menu.

6. The electronic device of claim 1, wherein, when the first menu is displayed to hide the second menu, the at least one processor is further configured to control for:
receiving a tap gesture or a swipe gesture with respect to the first menu, and
displaying the second menu to hide the first menu based on the tap gesture or the swipe gesture.

7. The electronic device of claim 1, wherein, when the first menu comprises a plurality of alphabet letters and the second menu comprises a plurality of numbers, the at least one processor is further configured to control for:
  receiving, based on the touch gesture, the first input for selecting one of the plurality of alphabet letters corresponding to the first point and the second input for selecting one of the plurality of numbers corresponding to the second point.

8. The electronic device of claim 7, wherein the at least one processor is further configured to control for:
  displaying an icon regarding at least one application having a name starting with a selected alphabet letter, based on the first input.

9. The electronic device of claim 8, wherein the at least one processor is further configured to control for:
  displaying an icon regarding a number of applications, which corresponds to a selected number, based on the second input.

10. The electronic device of claim 1, wherein the at least one processor is further configured to control for:
  displaying at least one group icon indicating a plurality of applications.

11. The electronic device of claim 1, wherein the at least one processor is further configured to control for:
  displaying the first menu comprising a plurality of icons corresponding to a plurality of applications related to an application being executed, and
  displaying the second menu comprising a plurality of items related to the application being executed.

12. The electronic device of claim 11, wherein the at least one processor is further configured to control for:
  linking an image corresponding to a selected item to a selected application, based on the first input of selecting one of the plurality of applications and the second input of selecting one of the plurality of items.

13. The electronic device of claim 1,
  wherein the first menu and the second menu have polygonal shapes, and
  wherein the plurality of parameters included in the first menu and the second menu are provided along the polygonal shapes.

14. The electronic device of claim 1,
  wherein the at least one processor is further configured to control for:
  displaying, on the display, at least one of a plurality of items based on the first input, the second input, and access frequencies of the plurality of items, and
  wherein the access frequencies include frequencies of a user accessing an application at a certain stage.

15. A method of displaying a plurality of items, the method comprising:
  displaying at least one of a first menu and a second menu;
  receiving a touch gesture of connecting a first point and a second point, wherein the first point determines a first parameter that is one of a plurality of parameters indicated in the first menu and the second point determines a second parameter that is one of a plurality of parameters indicated in the second menu;
  controlling a first input of selecting the first parameter and a second input of selecting the second parameter, to be performed based on the touch gesture; and
  displaying at least one of a plurality of items based on the first input and the second input,
  wherein the first input includes a touch input on the first menu,
  wherein the second input includes an input of rotating the first menu after the first input,
  wherein the second parameter is selected from among the plurality of parameters included in the second menu by rotating the first menu to move the first parameter in the first menu at a location of the first input to a location corresponding to the second parameter in the second menu,
  wherein the second parameter is selected along with the first parameter based on the second input, and
  wherein the second parameter is selected with the rotation of the first parameter.

16. A non-transitory computer-readable recording medium having recorded thereon at least one program comprising commands, which when executed by a computer, performs a method comprising:
  displaying at least one of a first menu and a second menu;
  receiving a touch gesture of connecting a first point and a second point, wherein the first point determines a first parameter that is one of a plurality of parameters indicated in the first menu and the second point determines a second parameter that is one of a plurality of parameters indicated in the second menu;
  controlling a first input of selecting the first parameter and a second input of selecting the second parameter, to be performed based on the touch gesture; and
  displaying at least one of a plurality of items based on the first input and the second input,
  wherein the first input includes a touch input on the first menu,
  wherein the second input includes an input of rotating the first menu after the first input,
  wherein the second parameter is selected from among the plurality of parameters included in the second menu by rotating the first menu to move the first parameter in the first menu at a location of the first input to a location corresponding to the second parameter in the second menu,
  wherein the second parameter is selected along with the first parameter based on the second input, and
  wherein the second parameter is selected with the rotation of the first parameter.

17. A method of managing a plurality of items based on an input detected by an electronic device, the method comprising:
  displaying a first menu including a plurality of first parameters and a second menu including a plurality of second parameters;
  detecting a first input provided to the first menu displaying the plurality of first parameters;
  detecting a second input provided to the first menu or the second menu; and
  displaying a set of candidate items based on the first input and the second input,
  wherein the first input selects a first candidate parameter from among the plurality of first parameters,
  wherein the second input provided to the first menu selects a second candidate parameter from among the plurality of second parameters included in the second menu by rotating the first menu after the first input to move the first candidate parameter in the first menu at a location of the first input to a location corresponding to the second candidate parameter in the second menu,
  wherein the second parameter is selected along with the first parameter based on the second input, and
  wherein the second parameter is selected with the rotation of the first parameter.

18. The method of claim 17, wherein the plurality of first parameters or the plurality of second parameters each comprise an alphabet letter, a character, a symbol, an icon, or an image.

19. The method of claim 17, wherein the first menu or the second menu are rotated by rotating a bezel.

\* \* \* \* \*